US010447519B2

(12) United States Patent
Huang et al.

(10) Patent No.: US 10,447,519 B2
(45) Date of Patent: Oct. 15, 2019

(54) TRANSMISSION APPARATUS AND TRANSMISSION METHOD FOR PADDING AND PACKET EXTENSION FOR DOWNLINK MULTIUSER TRANSMISSION

(71) Applicant: Panasonic Intellectual Property Management Co., Ltd., Osaka (JP)

(72) Inventors: Lei Huang, Singapore (SG); Yoshio Urabe, Nara (JP); Michael Hong Cheng Sim, Singapore (SG)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/011,315

(22) Filed: Jun. 18, 2018

(65) Prior Publication Data
US 2018/0302256 A1 Oct. 18, 2018

Related U.S. Application Data

(63) Continuation of application No. PCT/JP2016/004960, filed on Nov. 25, 2016.
(Continued)

(30) Foreign Application Priority Data

May 27, 2016 (JP) ................................ 2016-106268

(51) Int. Cl.
*H04L 27/26* (2006.01)
*H04L 1/00* (2006.01)
*H04L 5/00* (2006.01)

(52) U.S. Cl.
CPC ............ *H04L 27/2613* (2013.01); *H04L 1/00* (2013.01); *H04L 1/0041* (2013.01);
(Continued)

(58) Field of Classification Search
CPC .................................................. H04L 27/2613
See application file for complete search history.

(56) References Cited

U.S. PATENT DOCUMENTS 10,218,822 B2 * 2/2019 Zhang ..................... H04L 69/22
2014/0010154 A1 * 1/2014 Hong ....................... H04B 7/10
370/328
(Continued)

OTHER PUBLICATIONS

International Search Report of PCT application No. PCT/JP2016/004960 dated Feb. 14, 2017.
(Continued)

*Primary Examiner* — Shukri Taha
(74) *Attorney, Agent, or Firm* — Seed IP Law Group LLP

(57) ABSTRACT

A transmission method comprises: generating a transmission signal including OFDM symbols, wherein the last OFDM symbol of the OFDM symbols can be partitioned into four segments, and wherein the generating includes: computing an initial padding factor value associated with one of the four segments and computing an initial number of OFDM symbols; determining a user with a longest packet duration among plural users; determining a common padding factor value being the initial padding factor value and a common number of OFDM symbols being the initial number of OFDM symbols of the determined user with the longest packet duration; adding pre-FEC padding bits toward one of four possible boundaries of the last OFDM symbol, the one of four possible boundaries being represented by the determined common padding factor value; and adding post-FEC padding bits in remaining segment(s) of the last OFDM symbol; and transmitting the generated transmission signal.

12 Claims, 16 Drawing Sheets

Related U.S. Application Data

(60) Provisional application No. 62/278,884, filed on Jan. 14, 2016.

(52) U.S. Cl.
CPC .......... *H04L 1/0083* (2013.01); *H04L 5/0007* (2013.01); *H04L 5/0037* (2013.01); *H04L 5/0046* (2013.01); *H04L 5/0094* (2013.01); *H04L 27/26* (2013.01); *H04L 27/2662* (2013.01); *H04L 1/0057* (2013.01); *H04L 5/0023* (2013.01); *H04L 5/0044* (2013.01); *H04L 5/0053* (2013.01); *H04L 27/2605* (2013.01)

(56) References Cited

U.S. PATENT DOCUMENTS

2015/0365263 A1* 12/2015 Zhang .................. H04L 1/0057 375/295

2016/0227437 A1* 8/2016 Blanksby .................. H04L 1/00

OTHER PUBLICATIONS

IEEE 802.11-15/0132r13, "Specification Framework for TGax", Dec. 7, 2015.

IEEE 802.11-15/0810r1, "HE PHY Padding and Packet Extension", Sep. 12, 2015.

IEEE Computer Society, "Part11: Wireless LAN Medium Access Control (MAC) and Physical Layer (PHY) Specifications", IEEE Std 802.11(TM)-2012, Mar. 29, 2012.

IEEE Computer Society, "Part11: Wireless LAN Medium Access Control (MAC) and Physical Layer (PHY) Specifications Amendment 4: Enhancements for Very High Throughput for Operation in Bands below 6 GHz", IEEE Std 802.11ac(TM)-2013, Dec. 18, 2013.

* cited by examiner

FIG. 11

| FIELD | LENGTH (bits) | DESCRIPTION |
|---|---|---|
| BANDWIDTH | TBD | |
| SIGB MCS | 3 | |
| SIGB NUMBER OF SYMBOLS | 4 | |
| NUMBER OF GROUPS | 1 | INDICATE WHETHER THERE IS A SINGLE USER GROUP OR TWO USER GROUPS; |
| LPDC EXTRA SYMBOL FOR FIRST GROUP | 1 | |
| a-FACTOR FOR FIRST GROUP | 2 | |
| LPDC EXTRA SYMBOL FOR SECOND GROUP | 1 | RESERVED IF THERE IS A SINGLE GROUP |
| a-FACTOR FOR SECOND GROUP | 2 | RESERVED IF THERE IS A SINGLE GROUP |
| VALUE OF M | TBD | RESERVED IF THERE IS A SINGLE GROUP |
| PE DISAMBIGUITY | 1 | |
| ⋮ | | |
| CRC | 4 | |
| TAIL | 6 | |

FIG. 12A

| FIELD | LENGTH (bits) | DESCRIPTION |
|---|---|---|
| STA IDENTIFIER | 11 | |
| NUMBER OF SPATIAL STREAM | 3 | |
| MCS | 4 | |
| CODING | 1 | |
| GROUP INDICATION | 1 | INDICATE WHICH ONE OF THE FIRST GROUP AND THE SECOND GROUP EACH USER BELONGS TO |
| ⋮ | | |

FIG. 12B

| FIELD | LENGTH (bits) | DESCRIPTION |
|---|---|---|
| STA IDENTIFIER | 11 | |
| SPATIAL CONFIGURATION | 4 | |
| MCS | 4 | |
| CODING | 1 | |
| GROUP INDICATION | 1 | INDICATE WHICH ONE OF THE FIRST GROUP AND THE SECOND GROUP EACH USER BELONGS TO |
| ⋮ | | | though

TRANSMISSION APPARATUS AND TRANSMISSION METHOD FOR PADDING AND PACKET EXTENSION FOR DOWNLINK MULTIUSER TRANSMISSION

BACKGROUND

1. Technical Field

The present disclosure generally pertains to wireless communications and, more particularly, to a method for formatting and transmitting data in a wireless communications system.

2. Description of the Related Art

The IEEE (Institute of Electrical and Electronics Engineers) 802.11 Working Group is developing 802.11ax HE (High Efficiency) WLAN (Wireless Local Area Network) air interface in order to achieve a very substantial increase in the real-world throughput achieved by users in high density scenarios. OFDMA (Orthogonal Frequency Division Multiple Access) multiuser transmission has been envisioned as one of the most important features in 802.111ax. OFDMA is a multiple access scheme that performs multiple operations of data streams to and from the plurality of users over the time and frequency resources of the OFDM (Orthogonal Frequency Division Multiplexing) system.

Frequency scheduling is generally performed for OFDMA multiuser transmission in 802.11ax. According to frequency scheduling, a radio communication access point apparatus (hereinafter simply "access point" or "AP") adaptively assigns subcarriers to a plurality of radio communication station apparatuses (hereinafter simply "terminal stations" or "STAs") based on reception qualities of frequency bands of the STAs. This makes it possible to obtain a maximum multiuser diversity effect and to perform communication quite efficiently.

Frequency scheduling is generally performed based on a Resource Unit (RU). A RU comprises a plurality of consecutive subcarriers. A RU may have different types depending on the number of constituent subcarriers per RU. The RUs are assigned by an AP to each of a plurality of STAs with which the AP communicates. The RU assignment result of frequency scheduling performed by the AP shall be reported to the STAs as RU assignment information. In addition, the AP shall also report other control signaling such as common control information and per-user allocation information to STAs. IEEE Std 802.111ac-2013 is an example of related art.

SUMMARY

The transmission for all the STAs in downlink OFDMA shall end at the same time. Padding is a straightforward method for achieving this goal. In addition, packet extension may be applied to an HE packet in order for the receiver to have enough time to process the last OFDM symbol of the received HE packet since 802.11ax has an OFDM symbol duration which is four time larger than 802.11n/ac. Packet extension increases system overhead and but reduces implementation complexity of the receiver. Studies are underway to perform efficient padding and packet extension for downlink OFDMA multiuser transmission in 802.11ax to compromise implementation complexity and system overhead.

In one general aspect, the techniques disclosed here feature: a transmission method comprising: generating a transmission signal for each of a plurality of users, the transmission signal including a plurality of OFDM symbols for a data field, wherein the last OFDM symbol of the plurality of OFDM symbols can be partitioned into four segments, and wherein the generating of the transmission signal includes: computing, for each of the plurality of users, an initial padding factor value that is associated with one of the four segments and computing, for each of the plurality of users, an initial number of OFDM symbols for the data field; determining a user with a longest packet duration among the plurality of users; determining a common padding factor value that is the initial padding factor value of the determined user with the longest packet duration; determining a common number of OFDM symbols that is the initial number of OFDM symbols for the data field of the determined user with the longest packet duration; adding, for each of the plurality of users, pre-FEC padding bits toward one of four possible boundaries of the last OFDM symbol, the one of four possible boundaries being represented by the determined common padding factor value; and adding post-FEC padding bits in remaining segment(s) of the last OFDM symbol; and transmitting the generated transmission signal.

With padding and packet extension for downlink OFDMA multiuser transmission of the present disclosure, it is possible to minimize implementation complexity of the receiver while suppressing an increase of the system overhead due to packet extension.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 11 shows a diagram illustrating the content of the HE-SIG-A of the HE packet according to the first embodiment of the second aspect of the present disclosure;

FIG. 12A shows a diagram illustrating the content of each user specific subfield of the HE-SIG-B of the HE packet according to the first embodiment of the second aspect of the present disclosure;

FIG. 12B shows another diagram illustrating the content of each user specific subfield of the HE-SIG-B of the HE packet according to the first embodiment of the second aspect of the present disclosure;

DETAILED DESCRIPTION

Various embodiments of the present disclosure will now be described in detail with reference to the annexed drawings. In the following description, a detailed description of known functions and configurations has been omitted for clarity and conciseness.

Underlying Knowledge Forming Basis of the Present Disclosure

Figure 1:
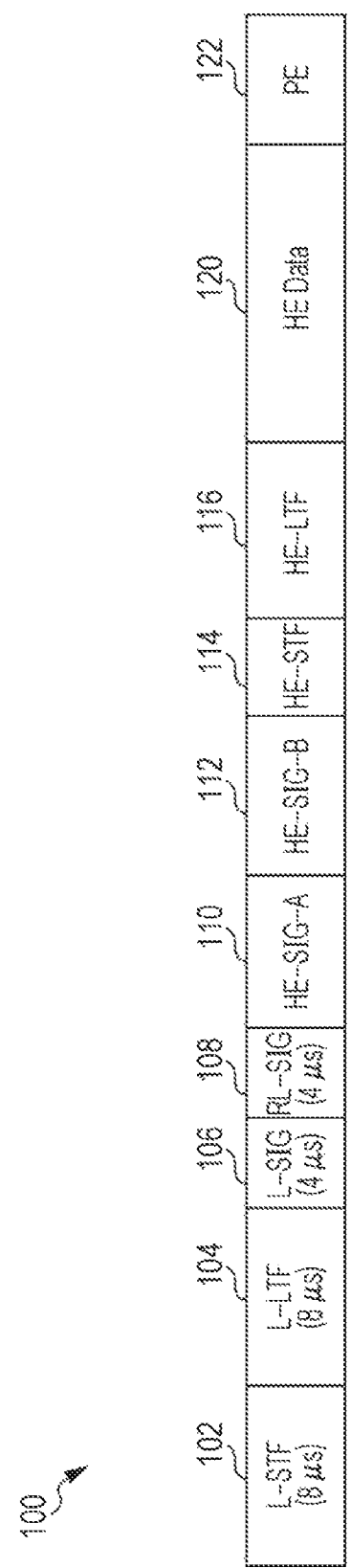
FIG. 1 shows a diagram illustrating the format of a HE (High Efficiency) packet complying with the 802.11ax specification framework document.

FIG. 1 illustrates a format of an HE (High Efficiency) packet 100 complying with the 802.11ax SFD (Specification Framework Document) [see IEEE 802.11-15/0132r13, Specification Framework for TGax, November 2015]. The HE packet 100 includes: a legacy preamble comprising a legacy short training field (L-STF) 102, a legacy long training field (L-LTF) 104 and a legacy signal field (L-SIG) 106; an HE preamble comprising a repeated L-SIG field (RL-SIG) 108, a first HE signal field (HE-SIG-A) 110, a second HE signal field (HE-SIG-B) 112, an HE short training field (HE-STF) 114 and an HE long training field (HE-LTF) 116; a HE data field 120; and a packet extension (PE) field 122.

The legacy preamble (102, 104, 106) is used to facilitate backwards compatibility with the legacy 802.11a/g/n/ac standards. The L-STF 102 and L-LTF 104 are primarily used for packet detection, AGC (Automatic Gain Control) setting, frequency offset estimation, time synchronization and channel estimation. The L-SIG 106, together with the RL-SIG 108 in the HE preamble which is duplicated from the L-SIG 106, is used to assist in differentiating the HE packet 100 from the legacy 802.11a/g/n/ac packets. In addition, the L-SIG 106 comprises a Length field which indicates the transmission time of the HE packet 100.

The HE-SIG-A 110 in the HE preamble carries common control information required to interpret the remaining fields of the HE packet 100. In case of the HE packet 100 for single user transmission, the HE-SIG-A 110 comprises signaling fields such as bandwidth, MCS (Modulation and Coding Scheme), the number of spatial streams ($N_{ss}$), coding, STBC (Space Time Block Coding), a-factor, PE Disambiguity and LDPC Extra Symbol, etc. The coding field indicates whether the FEC (Forward Error Correction) applied to the HE data field 120 is BCC (Binary Convolutional Code) or LDPC (Low Density Parity Code). The STBC field indicates whether STBC is applied to the HE data field 120. The usage of the a-factor field, the PE Disambiguity field and the LDPC Extra Symbol field will be explained later. In case of the HE packet 100 for downlink multiuser transmission, the HE-SIG-A 110 comprises signaling fields such as bandwidth, SIGB MCS, SIGB Number of Symbols, a-factor, PE Disambiguity and LDPC Extra Symbol, etc.

The HE-SIG-B 112 in the HE preamble comprises a common field followed by a user specific field. The common field contains RU assignment information (e.g., the RU arrangement in frequency domain and the number of users multiplexed in each RU). If a RU is designated for single user transmission, the number of users multiplexed in the RU is one. If a RU is designated for MU-MIMO (Multiuser Multiple Input Multiple Output) transmission, the number of users multiplexed in the RU is two or more. The user specific field comprises a plurality of user specific subfields. Each of the user specific subfields carries per-user allocation information. For each RU designated for single user transmission, there is only a single corresponding user specific subfield, which contains signaling fields such as STA identifier, MCS, coding and the number of spatial streams ($N_{ss}$), etc. For each RU designated for MU-MIMO transmission with K multiplexed users, there are K corresponding user specific subfields, each comprising signaling fields such as STA identifier, MCS, coding and spatial configuration, etc. The ordering of the user specific subfields in the user specific field is compliant with the RU arrangement signaled by the common field. The HE-SIG-B 112 does not exist in the HE packet 100 if it intends to be used for single user transmission or for uplink triggered based multiuser transmission. For uplink triggered based multiuser transmission, RU assignment information and per-user allocation information for designated transmitting STAs are preset at the AP and transmitted in a trigger frame by the AP to the designated transmitting STAs.

The HE-STF 114 in the HE preamble is used to reset AGC and reduces the dynamic range requirement on the ADC (Analog-to-Digital Converter). The HE-LTF 116 in the HE preamble is provided for MIMO channel estimation for receiving and equalizing the HE data field 120.

When BCC encoding is used for a STA, the HE data field 120 for the STA comprises the SERVICE field, the PSDU (Physical Layer Service Data Unit), the PHY (Physical Layer) padding bits and the tail bits. Note that the PSDU includes the MAC (Media Access Control Layer) padding bits. When LDPC encoding is used for a STA, the HE data field 120 for the STA comprises the SERVICE field, the PSDU and the PHY padding bits. The HE data field 120 for a STA is transmitted on its designated RU spanning all of OFDM symbols in the HE data field 120.

The PE field 122 carries null data, which is purely used to allow the receiver to have enough time to process the last OFDM symbol of the HE data field 120.

Details of transmission processing for the L-STF 102, the L-LTF 104, the L-SIG 106, the RL-SIG 108, the HE-SIG-A 110, the HE-SIG-B 112, the HE-STF 114, the HE-LTF 116, the HE data field 120 and the PE field 122 can be found in the 802.11ax SFD [see IEEE 802.11-15/0132r13, Specification Framework for TGax, November 2015].

According to the 802.111ax SFD [see IEEE 802.11-15/0132r13, Specification Framework for TGax, November 2015], a two-step padding process is applied to the HE data field 120 of the HE packet 100. A pre-FEC padding with both MAC and PHY padding is applied before conducting FEC coding, and a post-FEC PHY padding is applied on the FEC encoded bits (including information bits, pre-FEC padding bits and FEC parity bits). The pre-FEC padding may pad toward four possible boundaries in the last one or two OFDM symbols of the HE data field 120 of the HE packet 100 depending on whether STBC is applied to the HE data field 120. If no STBC is applied to the HE data field 120, the pre-FEC padding may pad toward four possible boundaries in the last OFDM symbol of the HE data field 120. Otherwise the pre-FEC padding may pad toward four possible boundaries in the last two OFDM symbols of the HE data field 120. The four possible boundaries are represented by a so-called a-factor parameter, which partition the FEC encoded bit stream of the last OFDM symbol(s) into four symbol segments.

Figure 2:
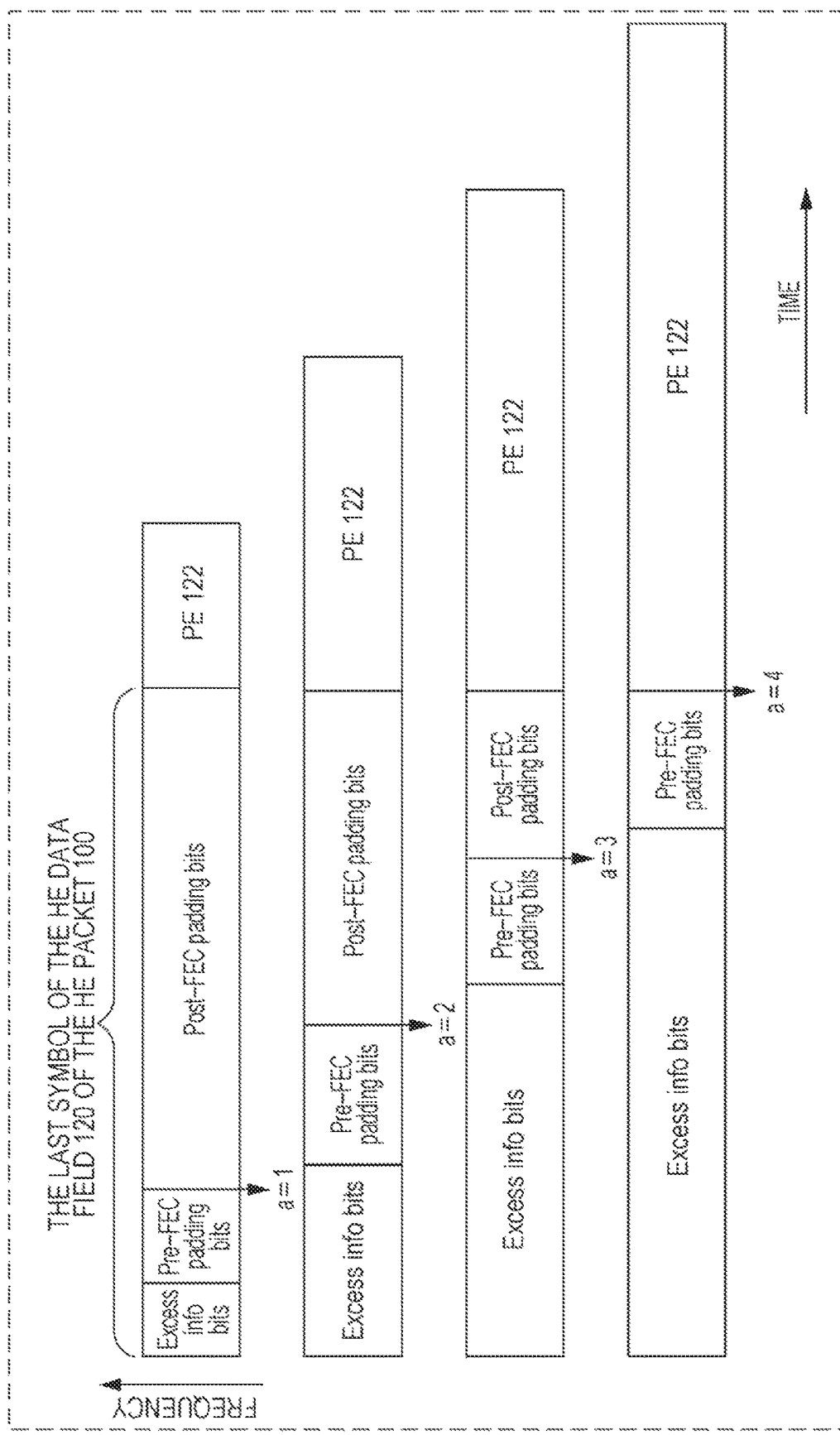
FIG. 2 shows a diagram illustrating example padding and PE (Packet Extension) for the HE packet for single user transmission in case of no STBC (Space-Time Block Coding) according to a prior art.

FIG. 2 illustrates various examples of padding and PE for the HE packet 100 for single user transmission in case of no STBC according to a prior art [see IEEE 802.11-15/0132r13, Specification Framework for TGax, November 2015 & IEEE 802.11-15/0810r1, HE PHY Padding and Packet Extension, September 2015]. In this example, for the a-factor having a value of 1, 2 or 3, the pre-FEC padding pads toward the first boundary, the second boundary or the third boundary in the last OFDM symbol of the HE data field 120. For the a-factor having a value of 4, the pre-FEC padding pads toward the end of the last OFDM symbol of the HE data field 120. The duration of the PE field 122 is a function of the pre-FEC padding boundary in the last OFDM symbol of the HE data field 120. Details of how the transmitter calculates the duration of the PE field 122 can be found in the 802.11ax SFD [see IEEE 802.11-15/0132r13, Specification Framework for TGax, November 2015 & IEEE 802.11-15/0810r1, HE PHY Padding and Packet Extension, September 2015]. If the LDPC is applied to the HE data field 120, the receiver needs not to process post-FEC padding bits in the last OFDM symbol of the HE data field 120. As a result, even if the duration of the PE field 122 is reduced for the smaller a-factor (e.g., as illustrated in FIG. 2, the duration of the PE field 122 in case of the a-factor having a value of 1 is smaller than that in case of the a-factor having a value of 2, 3 or 4), the receiver still has enough time to process the last OFDM symbol of the HE data field 120. In this way, implementation complexity of the receiver is minimized while an increase of the system overhead due to packet extension is suppressed.

Figure 3:
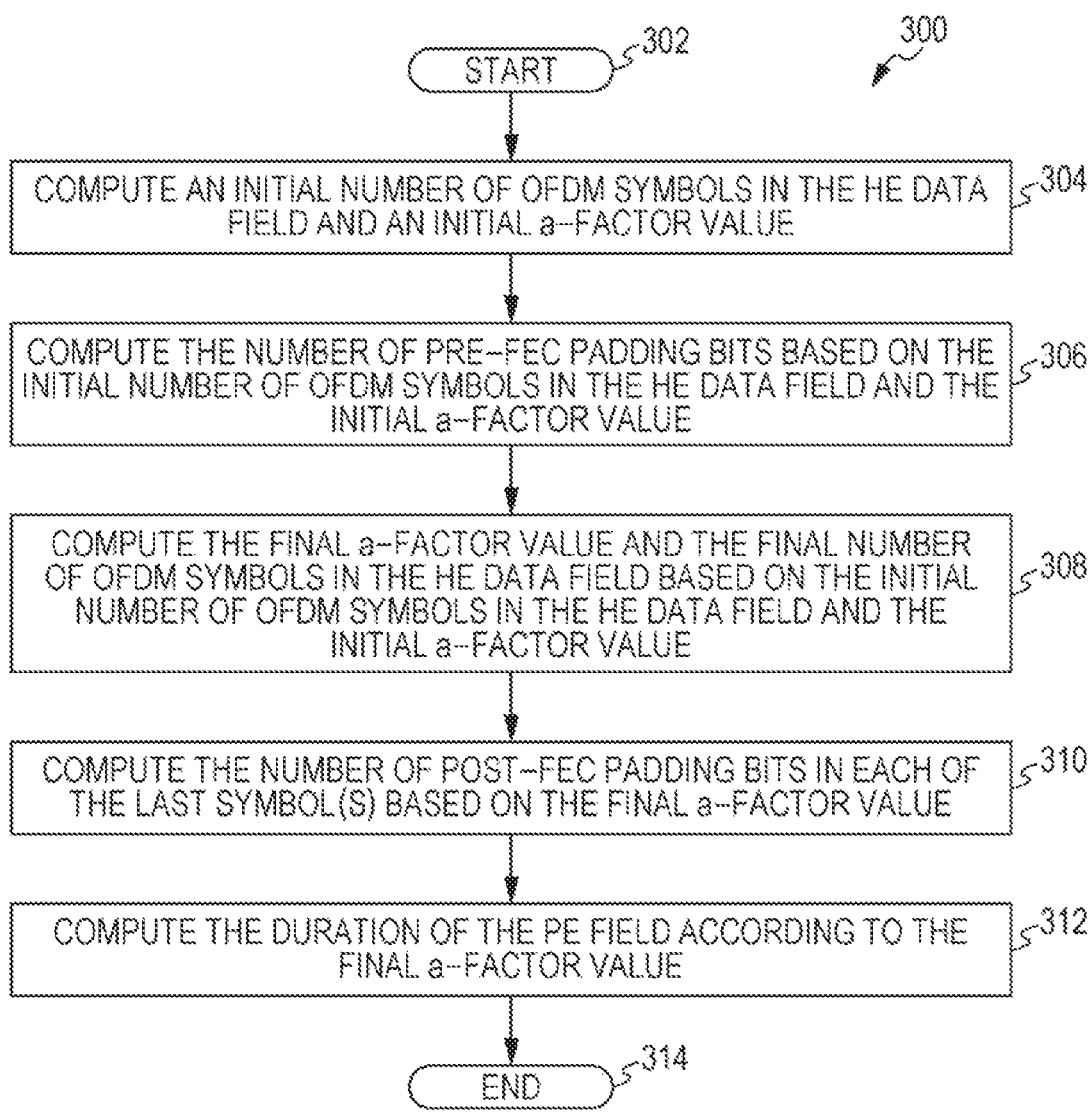
FIG. 3 shows a flowchart illustrating an example method for determining the padding and PE related parameters for single user transmission according to a prior art.

FIG. 3 illustrates an example method 300 for determining the padding and PE related parameters for single user transmission according to a prior art [see IEEE 802.11-15/0810r1, HE PHY Padding and Packet Extension, September 2015]. The method 300 starts at step 302 based on the following parameters:

$$N_{CBPS,short} = N_{SD,short} * N_{ss} * N_{BPSCS}$$

$$N_{DBPS,short} = N_{CBPS,short} * R$$

where $N_{SD,short}$ is the number of data subcarriers for each of the first three symbol segments, determined by the bandwidth which is indicated in the HE-SIG-A 110; $N_{SS}$ is the number of spatial streams which is indicated in the HE-SIG-A 110; R is the code rate, determined by the MCS which is indicated in the HE-SIG-A 110; and $N_{BPSCS}$ is the number of coded bits per subcarrier, determined by the MCS which is indicated in the HE-SIG-A 110.

At step 304, an initial number of OFDM symbols in the HE data field 120 and an initial a-factor value are computed. The initial number of OFDM symbols in the HE data field 120 is computed by the following formula:

$$N_{SYM\_init} = m_{STBC} \cdot \left\lceil \frac{8 \cdot APEP\_LENGTH + N_{tail} \cdot N_{ES} + N_{service}}{m_{STBC} \cdot N_{DBPS}} \right\rceil$$

where APEP_LENGTH is the A-MPDU (Aggregate MAC Protocol Data Unit) length prior to end-of-frame MAC padding; $N_{tail}$ is the number of tail bits and has a value of 6 for BCC and 0 for LDPC; $N_{ES}$ is the number of BCC encoders and has a value of either 1 or 2, determined by the MCS, $N_{SS}$ and bandwidth which are indicated in the HE-SIG-A 110; $N_{service}$ is the length of the SERVICE field and has a value of 16; $m_{STBC}$ has a value of 2 for STBC and 1 for no STBC; and $N_{DBPS}$ the number of data bits per OFDM symbol, determined by the MCS and bandwidth which are indicated in the HE-SIG-A 110. The initial a-factor is computed by the following formula:

$$a_{init} = \begin{cases} 1, \text{ if } 0 < N_{excess} \leq m_{STBC} \cdot N_{DBPS,short} \\ 2, \text{ if } m_{STBC} \cdot N_{DBPS,short} < N_{excess} \leq 2 \cdot m_{STBC} \cdot N_{DBPS,short} \\ 3, \text{ if } 2 \cdot m_{STBC} \cdot N_{DBPS,short} < N_{excess} \leq 3 \cdot m_{STBC} \cdot N_{DBPS,short} \\ 4, \text{ if } 3 \cdot m_{STBC} \cdot N_{DBPS,short} < N_{excess} \leq m_{STBC} \cdot N_{DBPS} \text{ OR } N_{excess} = 0 \end{cases}$$

where the number of excess information bits in the last OFDM symbol(s) of the HE data field 120 is shown by the following formula.

$$N_{excess} = \text{mod}(8 \cdot APEP\_LENGTH + N_{tail} * N_{ES} + N_{service}, m_{STBC} \cdot N_{DBPS})$$

At step 306, the number of pre-FEC padding bits is computed based on the initial number of OFDM symbols in the HE data field 120 and the initial a-factor value by the following formula.

$$N_{PAD,PRE-FEC} = (N_{SYM\_init} - m_{STBC}) \cdot N_{DBPS} +$$

$$m_{STBC} \cdot N_{DBPS,LAST,init} - 8 \cdot APEP\_LENGTH - N_{tail} \cdot N_{ES} - N_{service}$$

$$\text{where } N_{DBPS,LAST,init} = \begin{cases} a_{init} \cdot N_{DBPS,short}, \text{ if } a_{init} < 4 \\ N_{DBPS}, \text{ if } a_{init} = 4 \end{cases}$$

At step 308, the final a-factor value and the final number of OFDM symbols in the HE data field 120 are computed based on the initial number of OFDM symbols in the HE data field 120 and the initial a-factor value. In case of BCC, the final number of OFDM symbols in the HE data field 120 is $N_{SYM} = N_{SYM\_init}$, and the final a-factor is $a = a_{init}$. In case of LDPC, it is necessary to go through the LDPC encoding process in order to compute the final a-factor value and the final number of OFDM symbols in the HE data field 120. Starting from $$N_{pld} = (N_{SYM\_init} - m_{STBC}) \cdot N_{DBPS} + m_{STBC} \cdot N_{DBPS,LAST,init} \text{ and}$$

$$N_{avbits} = (N_{SYM\_init} - m_{STBC}) \cdot N_{CBPS} + m_{STBC} \cdot N_{CBPS,LAST,init} \text{ where}$$

$$N_{CBPS,LAST,init} = \begin{cases} a_{init} \cdot N_{CBPS,short}, & \text{if } a_{init} < 4 \\ N_{CBPS}, & \text{if } a_{init} = 4 \end{cases}$$

the LDPC encoding parameters such as the LDPC codeword length $L_{LDPC}$, the number of LDPC codewords $N_{CW}$, the number of shortening bits $N_{shrt}$ and the number of bits to be punctured $N_{punc}$ are computed by following steps b) to d) in 20.3.11.7.5 of IEEE 802.11-2012 [see IEEE Std 802.11-2012]. At step d), if $$\left((N_{punc} > 0.1 \cdot N_{CW} \cdot L_{LDPC} \cdot (1-R))\text{ AND }\left(N_{shrt} < 1.2 \cdot N_{punc} \cdot \frac{R}{1-R}\right)\right)$$

is true OR $$(N_{punc} > 0.3 * N_{CW} * L_{LDPC} * (1-R))$$

is true (i.e., the condition for setting the LDPC Extra Symbol field in the HE-SIG-A 110 to 1 is met), $$N_{avbits} = \begin{cases} N_{avbits} + m_{STBC} \cdot (N_{CBPS} - 3 \cdot N_{CBPS,short}), & \text{if } a_{init} = 3 \\ N_{avbits} + m_{STBC} \cdot N_{CBPS,short}, & \text{otherwise} \end{cases},$$

$$N_{punc} = \max(0, N_{CW} \cdot L_{LPDC} - N_{avbits} - N_{shrt}),$$

the final number of OFDM symbols in the HE data field 120 is $$N_{SYM} = \begin{cases} N_{SYM\_init} + m_{STBC}, & \text{if } a_{init} = 4 \\ N_{SYM\_init}, & \text{otherwise} \end{cases},$$

the final a-factor is $$a = \begin{cases} 1, & \text{if } a_{init} = 4 \\ a_{init} + 1, & \text{otherwise} \end{cases},$$

and the LDPC Extra Symbol field in the HE-SIG-A 110 sets to 1. Otherwise $NSYM = N_{SYM\_init}$, $a = a_{init}$, and the LDPC Extra Symbol field in the HE-SIG-A 110 sets to 0. Notice that the a-factor field in the HE-SIG-A 110 is set according to the final a-factor value.

At step 310, the number of post-FEC padding bits in each of the last symbol(s) is computed based on the final a-factor value by the following formula.

$$N_{PAD,POST\text{-}FEC} = N_{CBPS} - N_{CBPS,LAST}$$

where $$N_{CBPS,LAST} = \begin{cases} a \cdot N_{CBPS,short}, & \text{if } a < 4 \\ N_{CBPS}, & \text{if } a = 4 \end{cases}$$

At step 312, the duration of the PE field 122 is computed according to the final a-factor value. Notice that the PE Ambiguity field in the HE-SIG-A 110 and the Length field in the L-SIG 106 can be set according to the final number of OFDM symbols in the HE data field 120 and the duration of the PE field 122. Details can be found in the 802.11ax SFD [see IEEE 802.11-15/0132r13, Specification Framework for TGax, November 2015]. The method 300 stops at step 314.

Figure 4:
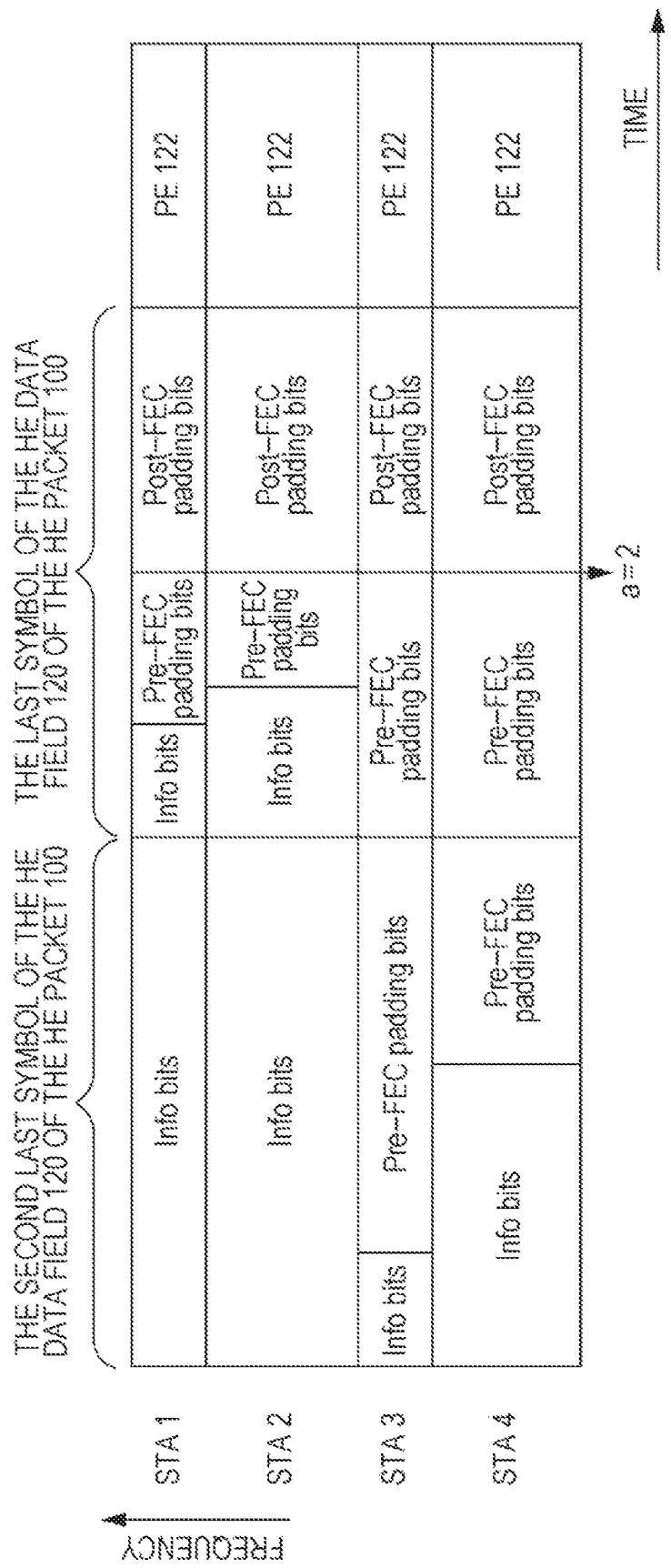
FIG. 4 shows a diagram illustrating the example padding and PE for the HE packet for downlink multiuser transmission in case of no STBC according to a prior art.

FIG. 4 illustrates the example padding and PE for the HE packet 100 for downlink multiuser transmission in case of no STBC according to a prior art [see IEEE 802.11-15/0132r13, Specification Framework for TGax, November 2015 & IEEE 802.11-15/0810r1, HE PHY Padding and Packet Extension, September 2015]. For downlink multiuser transmission, all the users share the same duration of the PE field 122, the common a-factor value and the common number of OFDM symbols in the HE data field 120. The common a-factor value is determined from the user with the longest encoded packet duration. In this example, the common a-factor has a value of 2 according to the STA2 which has the longest encoded packet duration. For each user, the pre-FEC padding pads toward the second boundary in the last OFDM symbol of the HE data field 120.

However, there is no concrete method available for determining the padding related parameters for downlink multiuser transmission (e.g., the common a-factor, the common number of OFDM symbols in the HE data field 120, per-user number of pre-FEC padding bits and per-user number of post-FEC padding bits, etc.). Next, according to a first aspect of the present disclosure, various embodiments of the method for determining the padding and PE related parameters for downlink multiuser transmission will be explained in further details.

First Embodiment

Figure 5:
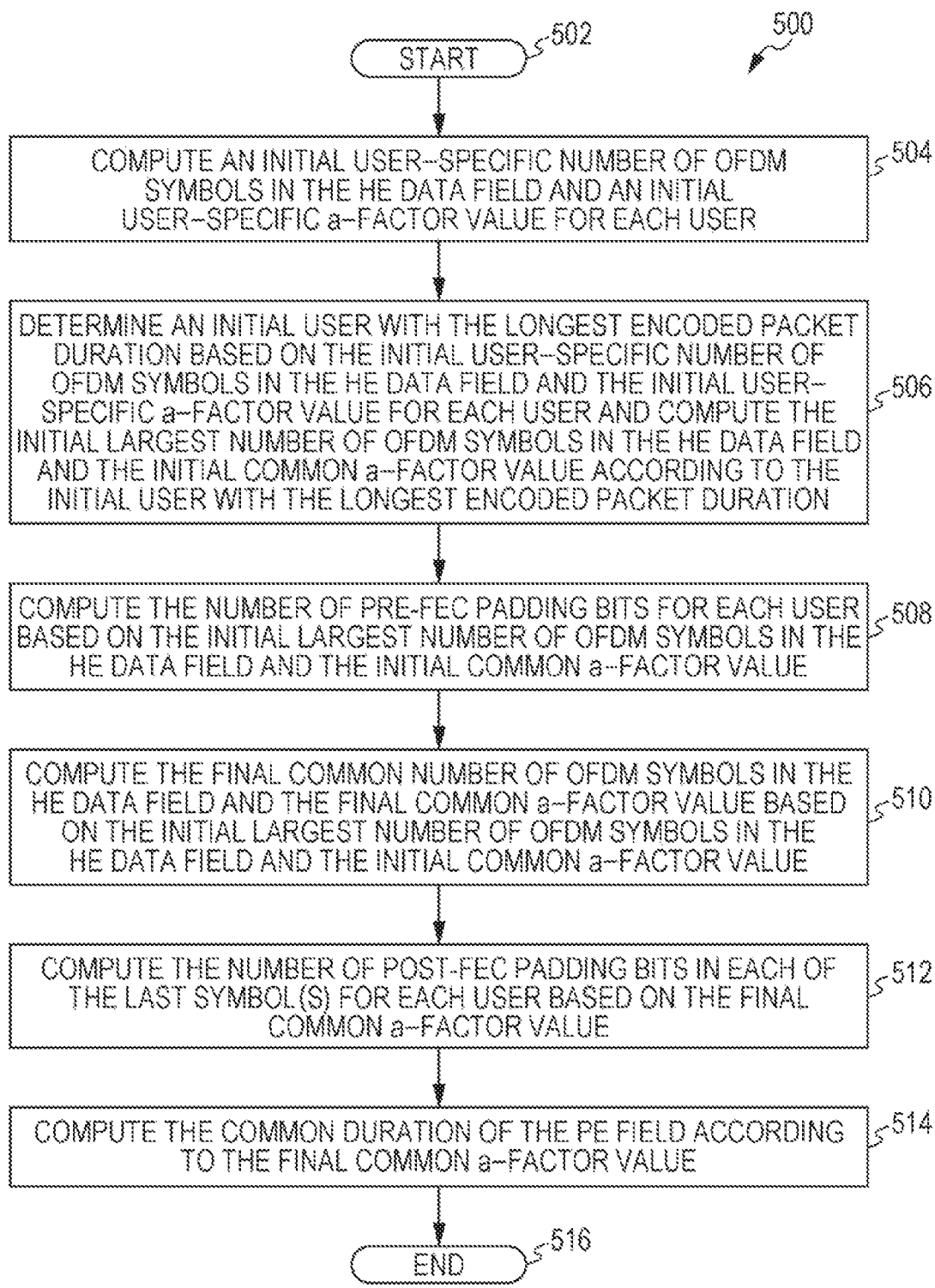
FIG. 5 shows a flowchart illustrating an example method for determining the padding and PE related parameters for downlink multiuser transmission according to a first embodiment of a first aspect of the present disclosure.

FIG. 5 illustrates an example method 500 for determining the padding and PE related parameters for downlink multiuser transmission according to a first embodiment of the first aspect of the present disclosure. The method 500 starts at step 502 based on the following parameters:

$$N_{CBPS,short,u} = N_{SD,short,u} \cdot N_{ss,u} * N_{BPSCS,u}$$

$$N_{DBPS,short,u} = N_{CBPS,short,u} \cdot R_u$$

where $N_{SD, short, u}$ is the number of data subcarriers for each of the first three symbol segments for user u, determined by the size of the RU assigned to user u which is indicated in the HE-SIG-B 112, $N_{SD, u}$ is the number of spatial streams for user u which is indicated in the HE-SIG-B 112, $R_u$ is the code rate for user u, determined by the MCS for user u which is indicated in the HE-SIG-B 112, and $N_{BPSCS, u}$ is the number of coded bits per subcarrier for user u, determined by the MCS for user u which is indicated in the HE-SIG-B 112.

At step 504, an initial user-specific number of OFDM symbols in the HE data field 120 and an initial user-specific a-factor value are computed for each user. The initial user-specific number of OFDM symbols in the HE data field 120 for user u is computed by the following formula:

$$N_{SYM\_init,u} = m_{STBC} \cdot \left\lceil \frac{\varepsilon \cdot \text{APEP\_LENGTH}_u + N_{tail} \cdot N_{ES,u} + N_{service}}{m_{STBC} \cdot N_{DBPS,u}} \right\rceil \quad (1)$$

where APEP_LENGTH$_u$ is the A-MPDU length prior to end-of-frame MAC padding for user u; $N_{ES,u}$ is the number of BCC encoders for user u, determined by the MCS for user u, $N_{SS}$ for user u and the size of the RU assigned to user u which are indicated in the HE-SIG-B 112; and $N_{DBPS,u}$ is the number of data bits per OFDM symbol, determined by the MCS for user u and the size of the RU assigned to user u which are indicated in the HE-SIG-B 112. The initial user-specific a-factor for user u is computed by the following formula.

$$a_{init,u} = \begin{cases} 1, \text{ if } 0 < N_{excess,u} \leq m_{STBC} \cdot N_{DBPS,short,u} \\ 2, \text{ if } m_{STBC} \cdot N_{DBPS,short,u} < N_{excess,u} \leq 2 \cdot m_{STBC} \cdot N_{DBPS,short,u} \\ 3, \text{ if } 2 \cdot m_{STBC} \cdot N_{DBPS,short,u} < N_{excess,u} \leq 3 \cdot m_{STBC} \cdot N_{DBPS,short,u} \\ 4, \text{ if } 3 \cdot m_{STBC} \cdot N_{DBPS,short,u} < N_{excess,u} \leq m_{STBC} \cdot N_{DBPS,u} \text{ OR } N_{excess,u} = 0 \end{cases} \quad (2)$$

where $$N_{excess,u} = \mathrm{mod}(8 \cdot APEP\_LENGTH_u + N_{tail} \cdot E_{ES,u} + N_{service}, m_{STBC} \cdot N_{DBPS,u})$$

At step 506, an initial user with the longest encoded packet duration is determined based on the initial user-specific number of OFDM symbols in the HE data field 120 and the initial user-specific a-factor value for each user by the following formula $$u_{max\_init} = \underset{u \in U}{\mathrm{argmax}}\{a_{init,u}\}$$

where $$U = \underset{u=0,1,\cdots,N_{user}-1}{\mathrm{argmax}} \{N_{SYM\_init,u}\}$$

and $N_{user}$ is the total number of users. The initial largest number of OFDM symbols in the HE data field 120 is shown by the following formula $$N_{SYM\_max\_init} = N_{SYM\_init,u_{max\_init}}$$

and the initial common a-factor value is shown by the following formula.

$$a_{init} = a_{init,u_{max\_init}}$$

At step 508, the number of pre-FEC padding bits for each user is computed based on the initial largest number of OFDM symbols in the HE data field 120 and the initial common a-factor value. For example, the number of pre-FEC padding bits for user u is given by the following formula.

$$N_{PAD,PRE\text{-}FEC,u} = (N_{SYM\_max\_init} - m_{STBC}) \cdot N_{DBPS,u} + m_{STBC} \cdot N_{DBPS,LAST,init,u} - 8 \cdot APEP\_LENGTH_u - N_{tail} \cdot N_{ES,u} - N_{service}$$

where $$N_{DBPS,LAST,init,u} = \begin{cases} a_{init} \cdot N_{DBPS,short,u}, \text{ if } a_{init} < 4 \\ N_{DBPS,u}, \text{ if } a_{init} = 4 \end{cases}$$

At step 510, the final common number of OFDM symbols in the HE data field 120 and the final common a-factor value are computed based on the initial largest number of OFDM symbols in the HE data field 120 and the initial common a-factor value. At first, the user-specific a-factor value and the user-specific number of OFDM symbols in the HE data field 120 are computed for each user based on the initial largest number of OFDM symbols in the HE data field 120 and the initial common a-factor value. For a user using LDPC, it is necessary to go through the LDPC encoding process in order to compute the user-specific a-factor value and the user-specific number of OFDM symbols in the HE data field 120. For example, if user u uses LDPC, starting from $$N_{pld,u} = (N_{SYM\_max\_init} - m_{STBC}) \cdot N_{DBPS,u} + m_{STBC} \cdot N_{DBPS,LAST,init,u}$$

and $$N_{avbits,u} = (N_{SYM\_max\_init} - m_{STBC}) \cdot N_{CBPS,u} + m_{STBC} \cdot N_{CBPS,LAST,init,u}$$

where $$N_{CBPS,LAST,init,u} = \begin{cases} a_{init} \cdot N_{CBPS,short,u}, \text{ if } a_{init} < 4 \\ N_{CBPS,u}, \text{ if } a_{init} = 4 \end{cases}$$

the LDPC encoding parameters $L_{LDPC,u}$, $N_{CW,u}$, $N_{shrt,u}$ and $N_{punc,u}$ for user u are computed by following steps b) to d) in 20.3.11.7.5 of IEEE 802.11-2012 [see IEEE Std 802.11-2012]. At step d), if $((N_{punc,u} > 0.1 * N_{CW,u} * L_{LDPC,u} * (1-R_u))$ AND $(N_{shrt,u} < 1.2 * N_{punc,u} * (R_u/(1-R_u)))$ is true OR $(N_{punc,u} > 0.3 * N_{CW,u} * L_{LDPC,u} * (1-R_u))$ is true (i.e., the condition for setting the LDPC Extra Symbol field in the HE-SIG-A 110 to 1 is met), $$N_{SYM,u} = \begin{cases} N_{SYM\_max\_init} + m_{STBC}, \text{ if } a_{init} = 4 \\ N_{SYM\_max\_init}, \text{ otherwise} \end{cases},$$

$$a_u = \begin{cases} 1, \text{ if } a_{init} = 4 \\ a_{init} + 1, \text{ otherwise} \end{cases},$$

and the LDPC Extra Symbol field in the HE-SIG-A 110 shall be set to 1. Otherwise $N_{SYM,u} = N_{SYM\_max,init}$ and $a_u = a_{init}$. If user u uses BCC, $N_{SYM,u} = N_{SYM\_max,init}$ and $a_u = a_{int}$. Next, the final user with the longest encoded packet duration is determined based on the user-specific a-factor values and the user-specific numbers of OFDM symbols in the HE data field 120 for all the users. If $N_{SYM,0} = N_{SYM,1} = \ldots = N_{SYM,Nuser-1}$, the final user with the longest encoded packet duration is shown by the following formula.

$$u_{max} = \operatorname*{argmax}_{u=0,1,\cdots,N_{user}-1} \{a_u\}$$

Otherwise the final user with the longest encoded packet duration is shown by the following formula.

$$u_{max} = \operatorname*{argmax}_{u=0,1,\cdots,N_{user}-1} \{N_{SYM,u}\}$$

Finally, the final common number of OFDM symbols in the HE data field 120 is $N_{SYM}=N_{SYM,umax}$ and the final common a-factor is $a=a_{umax}$. It should be noted that the a-factor field in the HE-SIG-A 110 is set according to the final common a-factor value.

According to the above descriptions of step 510, if all the users use BCC or if the condition for setting the LDPC Extra Symbol field in the HE-SIG-A 110 to 1 is not met for any user using LDPC, the final common number of OFDM symbols in the HE data field 120 is $N_{SYM}=N_{SYM\_max,int}$ and the final common a-factor is $a=a_{init}$. Otherwise the final common number of OFDM symbols in the HE data field 120 is shown by the following formula $$N_{SYM} = \begin{cases} N_{SYM\_max\_init} + m_{STBC}, & \text{if } a_{init} = 4 \\ N_{SYM\_max\_init}, & \text{otherwise} \end{cases}$$

and the final common a-factor is shown by the following formula.

$$a = \begin{cases} 1, & \text{if } a_{init} = 4 \\ a_{init} + 1, & \text{otherwise} \end{cases}$$

In addition, some LDPC encoding parameters for the users using LDPC need to be updated based on the final common a-factor value and the final common number of OFDM symbols in the HE data field 120. For example, for user u using LDPC, the number of available bits is updated by the following formula $$N_{avbits,u} = (N_{SYM} - m_{STBC}) \cdot N_{CBPS,u} + m_{STBC} \cdot N_{CBPS,LAST,u}$$

where $$N_{CBPS,LAST,u} = \begin{cases} a \cdot N_{CBPS,short,u}, & \text{if } a < 4 \\ N_{CBPS,u}, & \text{if } a = 4 \end{cases}$$

and the number of bits to be punctured is updated by $$N_{punc,u} = \max(0, N_{CW,u} \cdot L_{LDPC,u} - N_{avbits,u} - N_{shrt,u})$$

At step 512, the number of post-FEC padding bits in each of the last symbol(s) for each user is computed based on the final common a-factor value. For example, the number of post-FEC padding bits in each of the last symbol(s) for user u is given by the following formula.

$$N_{PAD,POST-FEC,u} = N_{CBPS,u} - N_{CBPS,LAST,u}$$

At step 514, the common duration of the PE field 122 is computed based on the final common a-factor value. Notice that the PE Ambiguity field in the HE-SIG-A 110 and the Length field in the L-SIG 106 can be set according to the final common number of OFDM symbols in the HE data field 120 and the common duration of the PE field 122. Details can be found in the 802.11ax SFD [see IEEE 802.11-15/0132r13, Specification Framework for TGax, November 2015]. The method 500 stops at step 516.

Second Embodiment

Figure 6:
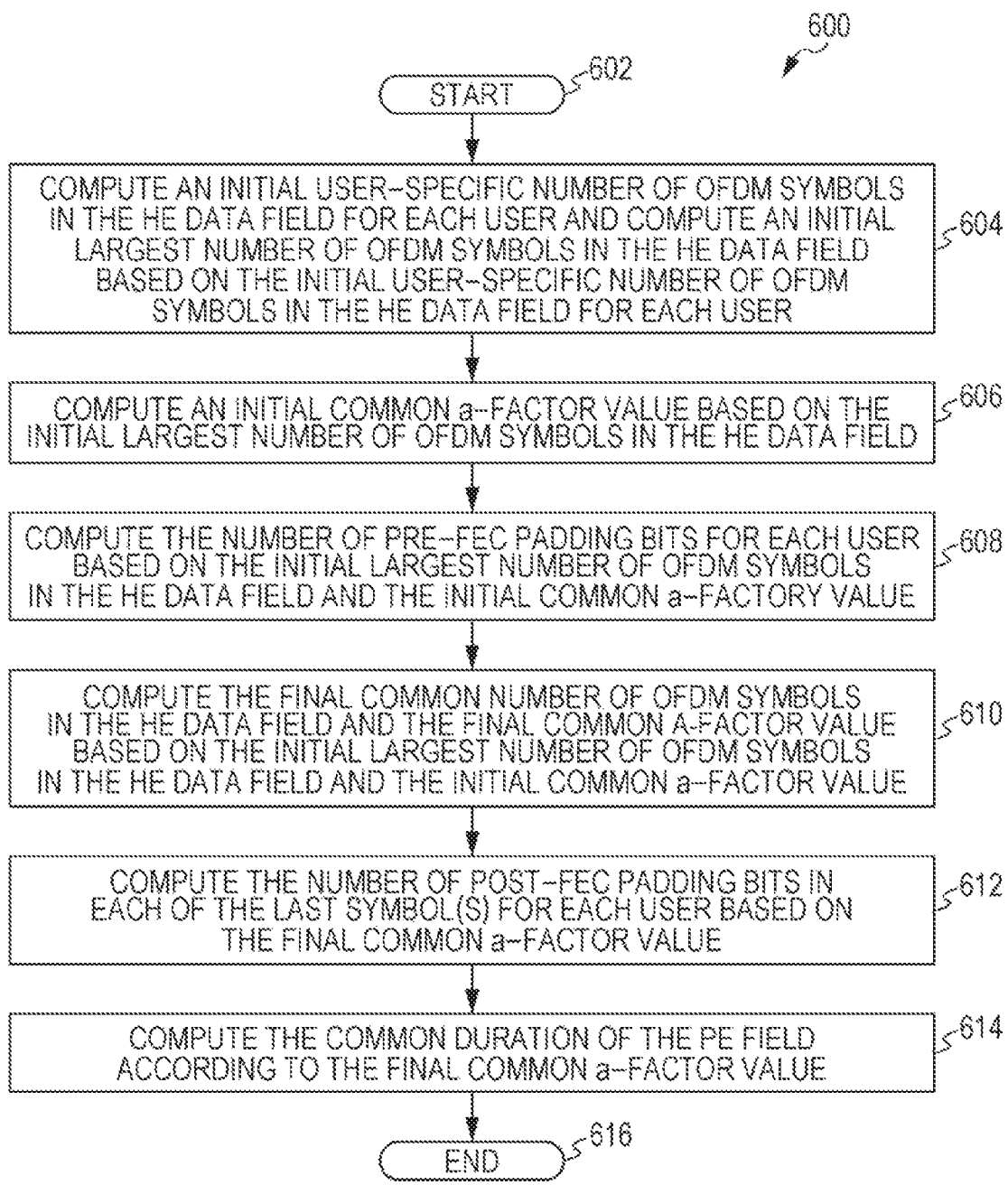
FIG. 6 shows a flowchart illustrating an example method for determining the padding and PE related parameters for downlink multiuser transmission according to a second embodiment of the first aspect of the present disclosure.

FIG. 6 illustrates an example method 600 for determining the padding and PE related parameters for downlink multiuser transmission according to a second embodiment of the first aspect of the present disclosure. The method 600 starts at step 602.

At step 604, an initial user-specific number of OFDM symbols in the HE data field 120 is computed for each user. For example, the initial user-specific number of OFDM symbols in the HE data field 120 for user u, $N_{SYM\_init,u}$, is computed according to Equation (1). Next an initial largest number of OFDM symbols in the HE data field 120 is computed based on the initial user-specific number of OFDM symbols in the HE data field 120 for each user by the following formula.

$$N_{SYM\_max\_init} = \max_{u=0,1,\ldots,N_{user}-1} \{N_{SYM\_init,u}\} \qquad (3)$$

At step 606, an initial common a-factor value is computed based on the initial largest number of OFDM symbols in the HE data field 120. At first a subset of users, S, with the initial largest number of OFDM symbols in the HE data field 120 is determined by the formula below.

$$S = \operatorname*{argmax}_{u=0,1,\ldots,N_{user}-1} \{N_{SYM\_init,u}\}$$

Then an initial user-specific a-factor value is computed for each user in the subset. For example, an initial user-specific a-factor value for user u in the subset, $a_{init,u}$, is computed according to Equation (2). Finally the initial common a-factor is shown by the formula below.

$$a_{init} = \max_{u \in S} \{a_{init,u}\}$$

Step 608 to step 614 of the method 600 are the same as step 508 to step 514 of the method 500, respectively. The method 600 stops at step 616.

According to step 604 and step 606 of the method 600, in order to calculate the initial common a-factor value and the initial largest number of OFDM symbols in the HE data field 120, the initial user-specific a-factor values only for a subset of users need to be computed. As a result, the method 600 is more efficient than the method 500 in terms of computational complexity.

Third Embodiment

Figure 7:
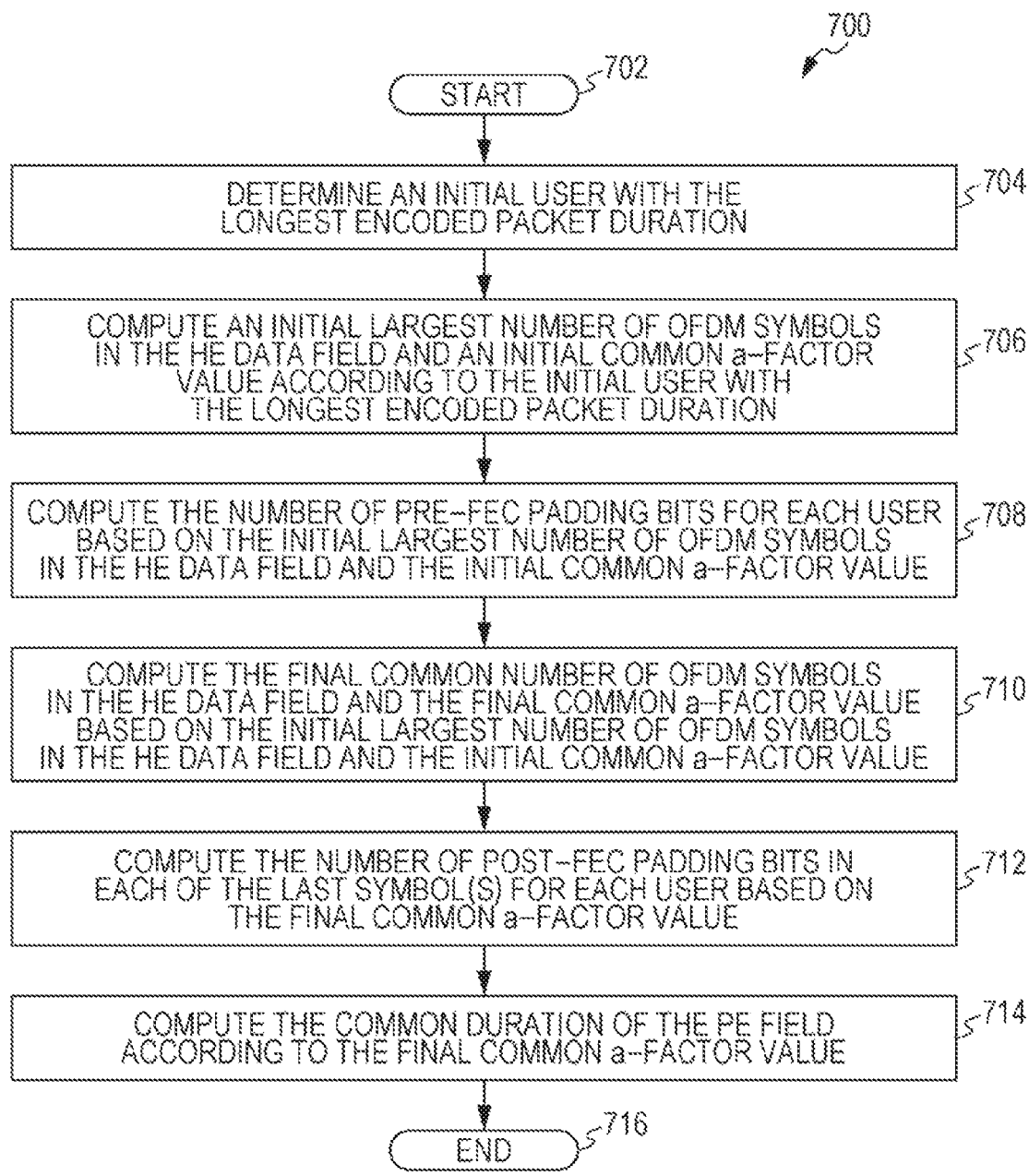
FIG. 7 shows a flowchart illustrating an example method for determining the padding and PE related parameters for downlink multiuser transmission according to a third embodiment of the first aspect of the present disclosure.

FIG. 7 illustrates an example method 700 for determining the padding and PE related parameters for downlink multiuser transmission according to a third embodiment of the first aspect of the present disclosure. The method 700 starts at step 702.

At step 704, an initial user with the longest encoded packet duration is determined by the following formula.

$$u_{max\_init} = \underset{u=0,1,\ldots,N_{user}-1}{\mathrm{argmax}}\left\{\frac{8 \cdot APEP\_LENGTH_u + N_{tail} \cdot N_{ES,u} + N_{service}}{N_{DBPS,u}}\right\}$$

At step 706, an initial largest number of OFDM symbols in the HE data field 120 and an initial common a-factor value are computed according to the initial user with the longest encoded packet duration. The initial largest number of OFDM symbols in the HE data field 120 is computed by $N_{SYM\_max\_init} = N_{SYM\_init,umax\_init}$, where the initial number of OFDM symbols in the HE data field 120 for user $u_{max\_init}$, $N_{SYM\_init,umax\_init}$, can be computed according to Equation (1). The initial common a-factor is $a_{init} = a_{init,\,umax\_init}$, where the initial user-specific a-factor for user $u_{max\_init}$, $a_{init,umax\_init}$, can be computed according to Equation (2).

Step 708 to step 714 of the method 700 are the same as step 508 to step 514 of the method 500, respectively. The method 700 stops at step 716.

According to step 704 and step 706 of the method 700, in order to calculate the initial common a-factor value and the initial largest number of OFDM symbols in the HE data field 120, the initial user-specific a-factor value only for a single user needs to be computed. As a result, the method 700 is even more efficient than the method 600 in terms of computational complexity.

With reference to FIG. 4, according to the prior arts [see IEEE 802.11-15/0132r13, Specification Framework for TGax, November 2015 & IEEE 802.11-15/0810r1, HE PHY Padding and Packet Extension, September 2015], even if the last OFDM symbol in the HE data field 120 may not contain information bits for some users (e.g., STA3 and STA4), these users are still required to process the last OFDM symbol in the HE data field 120, which leads to increased power consumption.

According to a second aspect of the present disclosure, all users are grouped into two groups. The first group comprises at least one user that has FEC encoded bits spanned over all of the OFDM symbols in the HE data field 120. The second group comprises the users that have FEC encoded bits spanned over only a part of the OFDM symbols in the HE data field 120.

Figure 8:
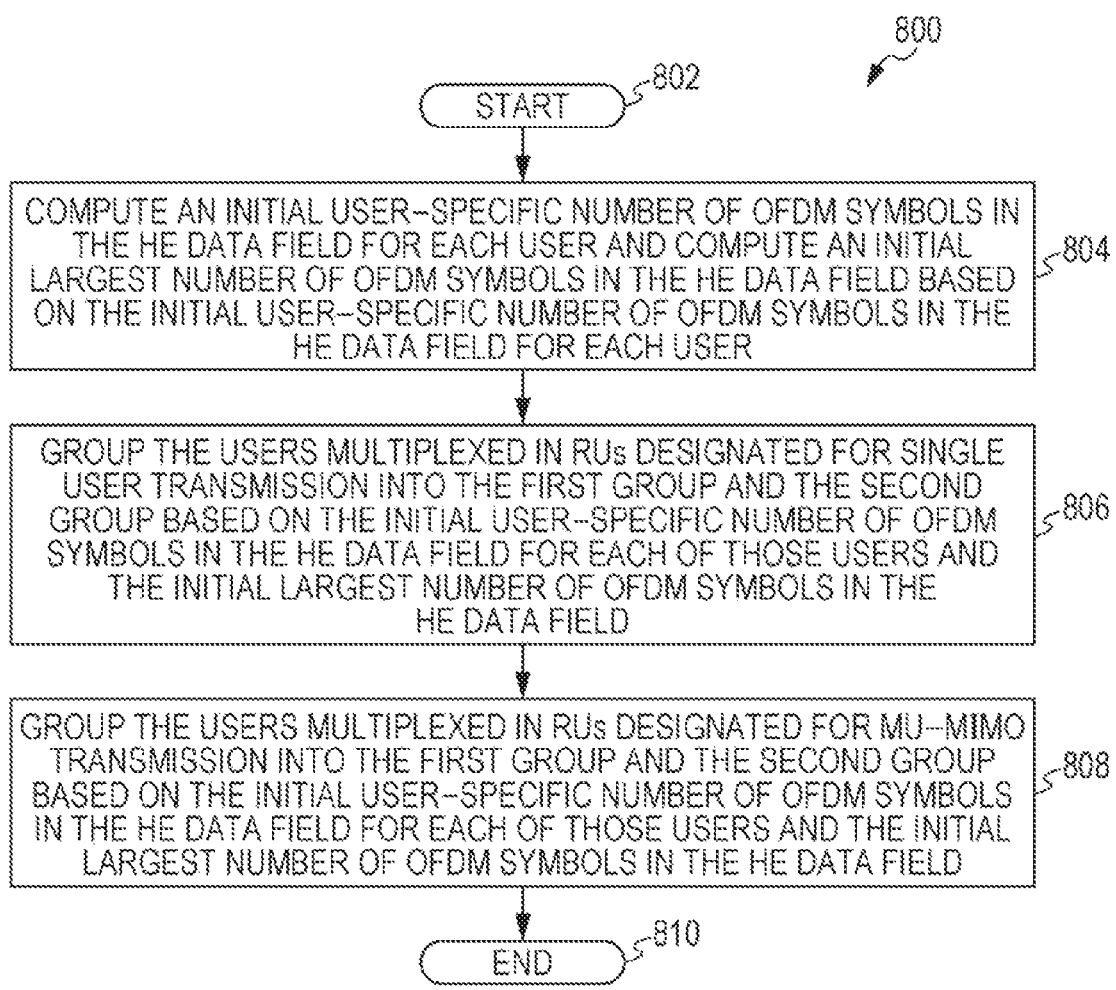
FIG. 8 shows a flowchart illustrating an example method for user grouping according to a second aspect of the present disclosure.

FIG. 8 illustrates an example method for user grouping according to the second aspect of the present disclosure. The method 800 starts step 802. At step 804, an initial number of OFDM symbols in the HE data field 120 for each user is computed. For example, an initial number of OFDM symbols in the HE data field 120 for user u, $N_{SYM\_init,u}$, can be computed according to Equation (1). Then an initial largest number of OFDM symbols in the HE data field 120, $N_{SYM\_max,init}$, can be computed according to Equation (3) based on the initial number of OFDM symbols in the HE data field 120 for each user.

At step 806, the users multiplexed in RUs designated for single user transmission are grouped into the first group and the second group. For user u multiplexed in a RU designated for single user transmission, it will be grouped into the second group if $$N_{SYM\_init,u} \leq N_{SYM\_max\_init} - M$$

where M is a positive integer (e.g., M=1) and its value is predetermined or configurable. Otherwise it will be grouped into the first group.

At step 808, the users multiplexed in RUs designated for MU-MIMO transmission are grouped into the first group and the second group. For a cluster of users multiplexed in a RU designated for MU-MIMO transmission, at first the initial largest number of OFDM symbols in the HE data field 120 among the cluster of users is determined by the following formula:

$$N_{SYM\_max\_init,cluster} = \max_{u \in C}\{N_{SYM\_init,u}\}$$

where C stands for the cluster of users multiplexed in the RU designated for MU-MIMO transmission. The whole cluster of users will be grouped into the second group if the following condition is met.

$$N_{SYM\_max\_init,cluster} \leq N_{SYM\_max\_init} - M$$

Otherwise the whole cluster of users will be grouped into the first group. In other words, the whole cluster of users multiplexed in a RU designated for MU-MIMO transmission shall be grouped into the same group. The method 800 stops at step 810.

According to the user grouping method 800 illustrated in FIG. 8, the initial largest number of useful OFDM symbols in the HE data field 120 for the second group is shown by the following formula.

$$N_{SYM\_max\_init,G_2} = N_{SYM\_max\_init} - M \quad (4)$$

According to the second aspect of the present disclosure, all the users share the common number of OFDM symbols in the HE data field 120 and the common duration of the PE field 122. The common number of OFDM symbols in the HE data field 120 and the common duration of the PE field 122, together with other padding related parameters specific to the first group (e.g., the a-factor for the first group), can be determined according to the user in the first group with the longest encoded packet duration using one of the methods according to the abovementioned three embodiments of the first aspect of the present disclosure. For each of the users in the first group, the pre-FEC padding pads towards the boundary in the last OFDM symbol(s) in the HE data field 120, specified by the a-factor value for the first group.

According to the second aspect of the present disclosure, the padding related parameters specific to the second group (e.g., the number of useful OFDM symbols in the HE data field 120 for the second group and the a-factor for the second group) are determined according to the user in the second group with the longest encoded packet duration. The methods for determining the padding related parameters specific to the second group will be detailed later. The useful OFDM symbols in the HE data field 120 for the second group refer to those OFDM symbols in the HE data field 120 that contain FEC encoded bits for at least one of the users in the second group. For each of the users in the second group, the pre-FEC padding pads towards the boundary in the last useful OFDM symbol(s) in the HE data field 120 for the second group, specified by the a-factor value for the second group.

Figure 9:
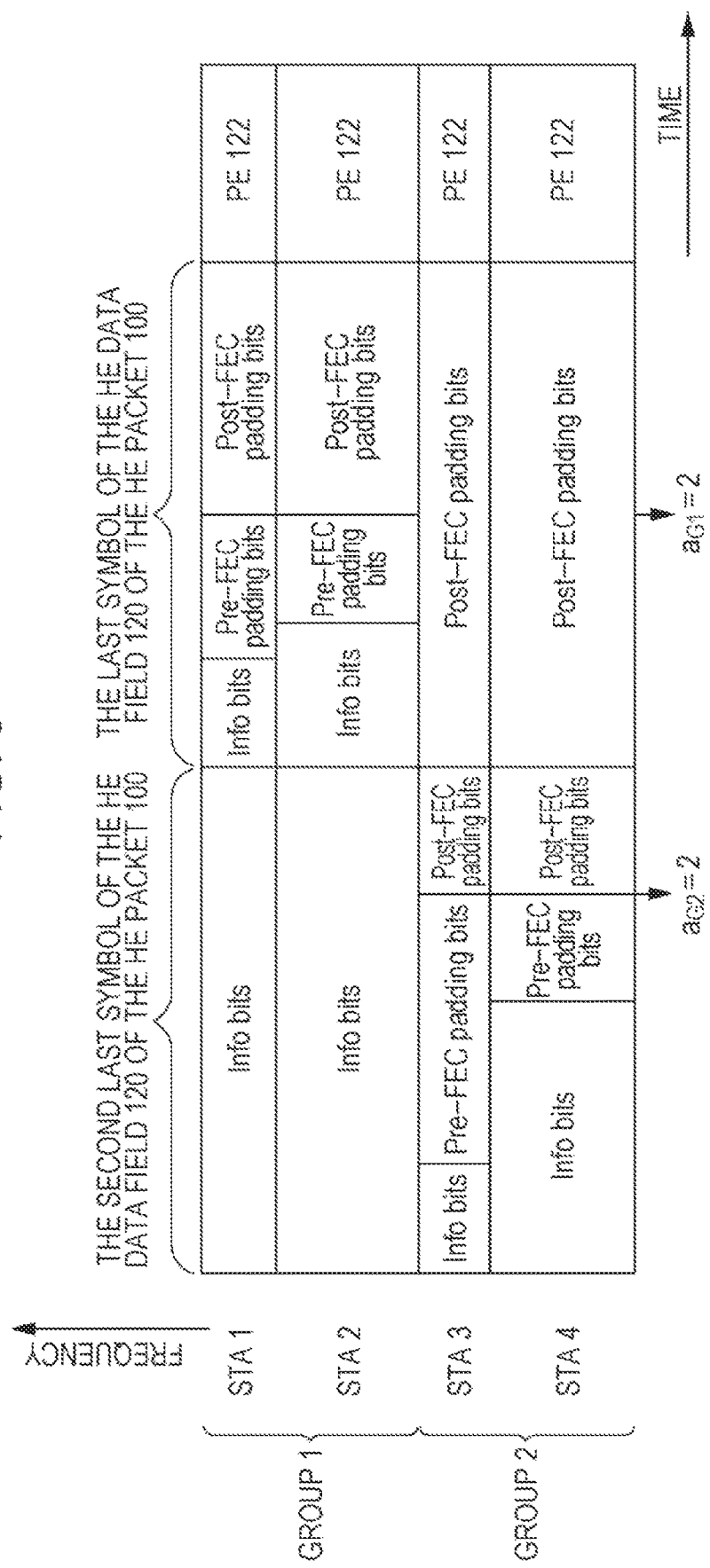
FIG. 9 shows a diagram illustrating example padding and PE for the HE packet for downlink multiuser transmission in case of no STBC according to the second aspect of the present disclosure.

FIG. 9 illustrates example padding and packet extension for the HE packet 100 for downlink multiuser transmission in case of no STBC according to the second aspect of the present disclosure. In this example, the first group comprises STA1 and STA2 while the second group comprises STA3 and STA4. The a-factor for the first group has a value of 2 and the a-factor for the second group has a value of 3. The number of useful OFDM symbols in the HE data field 120 for the second group is one symbol less than the common number of OFDM symbols in the HE data field 120. In other words, for each of the users in the first group (i.e., STA1 and STA2), the pre-FEC padding pads towards the second boundary in the last OFDM symbol in the HE data field 120; while for each of the users in the second group (i.e., STA3 and STA4), the pre-FEC padding pads towards the third boundary in the second last OFDM symbol in the HE data field 120. As a result, the users in the second group (i.e., STA3 and STA4) need not to process the last OFDM symbol in the HE data field 120 and therefore power consumption is reduced compared with the prior arts [see IEEE 802.11-15/0132r13, Specification Framework for TGax, November 2015 & IEEE 802.11-15/0810r1, HE PHY Padding and Packet Extension, September 2015].

Fourth Embodiment

Figure 10:
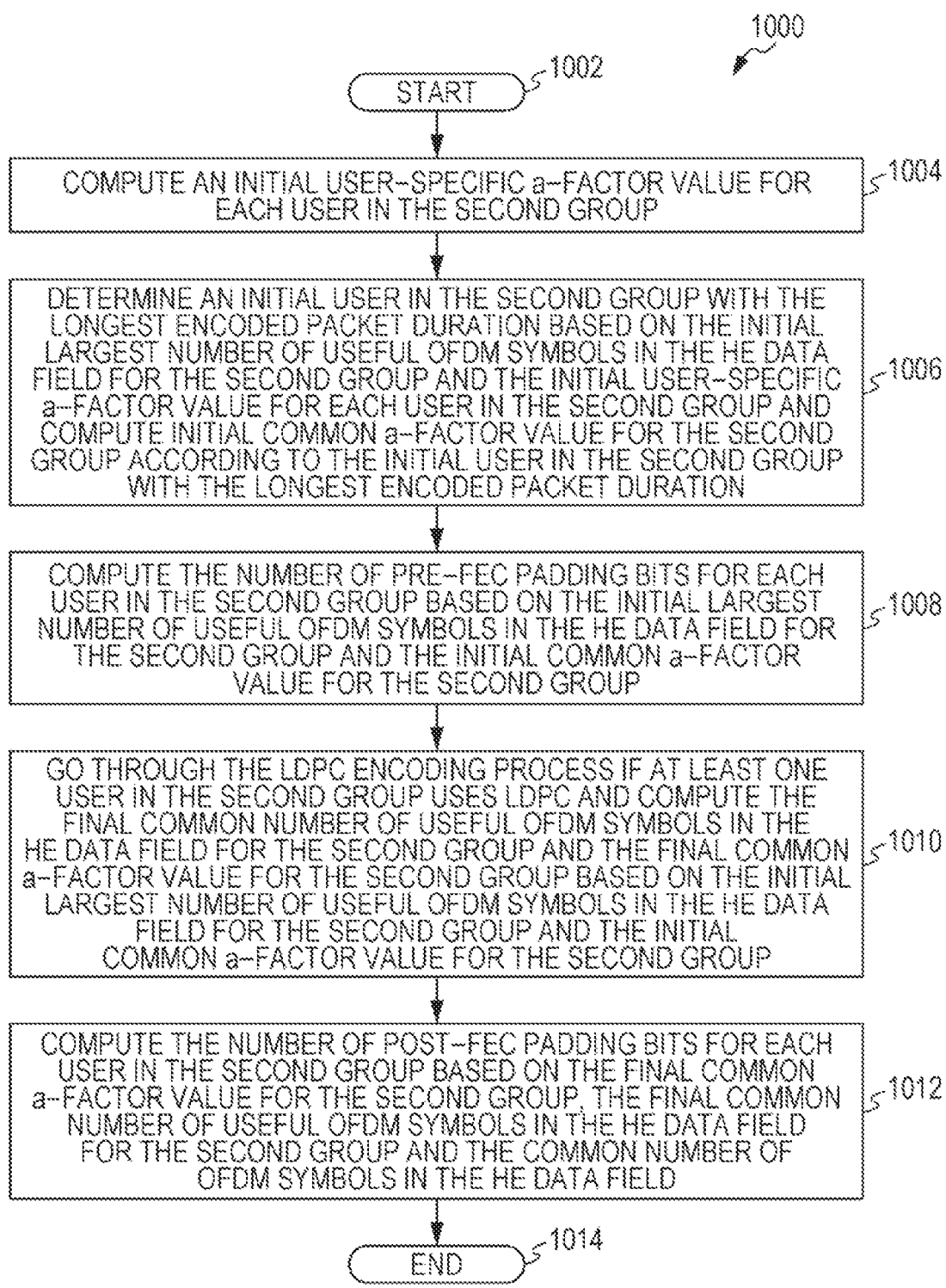
FIG. 10 shows a flowchart illustrating an example method for determining the padding related parameters for the second group according to a first embodiment of the second aspect of the present disclosure.

FIG. 10 illustrates an example method 1000 for determining the padding related parameters specific to the second group according to the first embodiment of the second aspect of the present disclosure. The method 1000 starts at step 1002. At step 1004, an initial user-specific a-factor value is computed for each user in the second group. For example, the initial user-specific a-factor for user u, $a_{init,u}$, in the second group can be computed according to Equation (2).

At step 1006, an initial user in the second group with the longest encoded packet duration is determined based on the initial user-specific a-factor value for each user in the second group and the initial largest number of useful OFDM symbols in the HE data field 120 for the second group, $N_{SYM\_max\_init,G2}$, which can be obtained according to Equation (4) during the user grouping. At first a subset of users, U, in the second group with the initial largest number of useful OFDM symbols in the HE data field 120 is determined by the following formula:

$$U = \underset{u=0,1,\ldots,N_{user,G_2}-1}{\arg\max} \{N_{SYM\_max\_init,G_2}\}$$

where $N_{user,G2}$ is the number of users in the second group. The initial user in the second group with the longest encoded packet duration is determined by the following formula.

$$u_{max\_init} = \underset{u \in U}{\arg\max} \{a_{init,u}\}$$

Then the initial common a-factor value for the second group is shown by the following formula.

$$a_{init,G_2} = a_{init,u_{max\_init}}$$

At step 1008, the number of pre-FEC padding bits for each user in the second group are computed based on the initial largest number of useful OFDM symbols in the HE data field 120 for the second group and the initial common a-factor value for the second group. For example, the number of pre-FEC padding bits for user u in the second group is computed by the following formula.

$$N_{PAD,PRE-FEC,u} = (N_{SYM\_max\_init,G_2} - m_{STBC}) \cdot N_{DBPS,u} + m_{STBC} \cdot N_{DBPS,LAST,init,u} - 8 \cdot \text{APEP\_LENGTH}_u - N_{tail} \cdot N_{es,u} - N_{service}$$

where $$N_{DBPS,LAST,init,u} = \begin{cases} a_{init,G_2} \cdot N_{DBPS,short,u}, & \text{if } a_{init,G_2} < 4 \\ N_{DBPS,u}, & \text{if } a_{init,G_2} = 4 \end{cases}$$

At step 1010, the final common number of useful OFDM symbols in the HE data field 120 for the second group and the final common a-factor value for the second group are computed based on the initial largest number of useful OFDM symbols in the HE data field 120 for the second group and the initial common a-factor value for the second group. Similar to step 510 of the method 500 as illustrated in FIG. 5, it is necessary to go through the LDPC encoding process in order to compute the final common number of useful OFDM symbols in the HE data field 120 for the second group and the final common a-factor value for the second group if at least one user in the second group uses LDPC. If all the users in the second group use BCC or if the condition for setting the LDPC Extra Symbol for the Second Group field in the HE-SIG-A 110 to 1 is not met for any user in the second group using LDPC, the final common number of useful OFDM symbols in the HE data field 120 for the second group is $N_{SYM,G2}=N_{SYM\_max\_init,G2}$ and the final common a-factor for the second group is $a_{G2}=a_{init,G2}$. Otherwise the final common number of useful OFDM symbols in the HE data field 120 for the second group is shown by the following formula $$N_{SYM,G_2} = \begin{cases} N_{SYM\_max\_init,G_2} + m_{STBC}, & \text{if } a_{init,G_2} = 4 \\ N_{SYM\_max\_init,G_2}, & \text{otherwise} \end{cases}$$

and the final common a-factor for the second group is shown by the following formula.

$$a_{G_2} = \begin{cases} 1, & \text{if } a_{init,G_2} = 4 \\ a_{init,G_2} + 1, & \text{otherwise} \end{cases}$$

At step 1012, the number of post-FEC padding bits for each user in the second group is computed based on the final common a-factor value for the second group, the final common number of useful OFDM symbols in the HE data field 120 for the second group and the common number of OFDM symbols in the HE data field 120. For example, the number of post-FEC padding bits for user u in the second group is computed by the following formula.

$$N_{PAD,POST-FEC,u} = \frac{N_{SYM} - N_{SYM,G_2}}{m_{STBC}} \cdot N_{CBPS,u} + N_{CBPS,u} - N_{CBPS,LAST,u}$$

where $$N_{CBPS,LAST,u} = \begin{cases} a_{G_2} \cdot N_{CBPS,short,u}, & \text{if } a_{G_2} < 4 \\ N_{CBPS,u}, & \text{if } a_{G_2} = 4 \end{cases}$$

The method 1000 stops at step 1014.

FIG. 11 illustrates the content of the HE-SIG-A 110 of the HE packet 100 according to the first embodiment of the second aspect of the present disclosure. The following signalling fields are required in the HE-SIG-A 110:

Number of Groups, which indicates whether there is a single user group or two user groups;
PE Disambiguity;
a-factor for the First Group;
LDPC Extra Symbol for the First Group;
a-factor for the Second Group;
LDPC Extra Symbol for the Second Group; and
Value of M Notice that in case of a single user group, the a-factor for the Second Group field, the LDPC Extra Symbol for the Second Group field and the Value of M field are reserved. In addition, if the value of M is predetermined, the Value of M field can be ignored.

FIG. 12 illustrates the content of each user-specific subfield of the HE-SIG-B 112 of the HE packet 100 according to the first embodiment of the second aspect of the present disclosure. A Group Indication field shall be present in each user-specific subfield of the HE-SIG-B 112 to indicate which one of the first group and the second group each user belongs to.

Fifth Embodiment

According to a second embodiment of the second aspect of the present disclosure, the condition for setting the LDPC Extra Symbol for the Second Group field in the HE-SIG-A 110 to 1 is assumed to be met for at least one user in the second group. As a result, the LDPC Extra Symbol for the Second Group field in the HE-SIG-A 110 can be ignored, which leads to reduced signaling requirement in the HE-SIG-A 110. Furthermore, unlike the first embodiment of the second aspect of the present disclosure, there is no need of going through the LDPC encoding process in order to compute the final common a-factor value for the second group and the final common number of useful OFDM symbols in the HE data field 120 for the second group.

Figure 13:
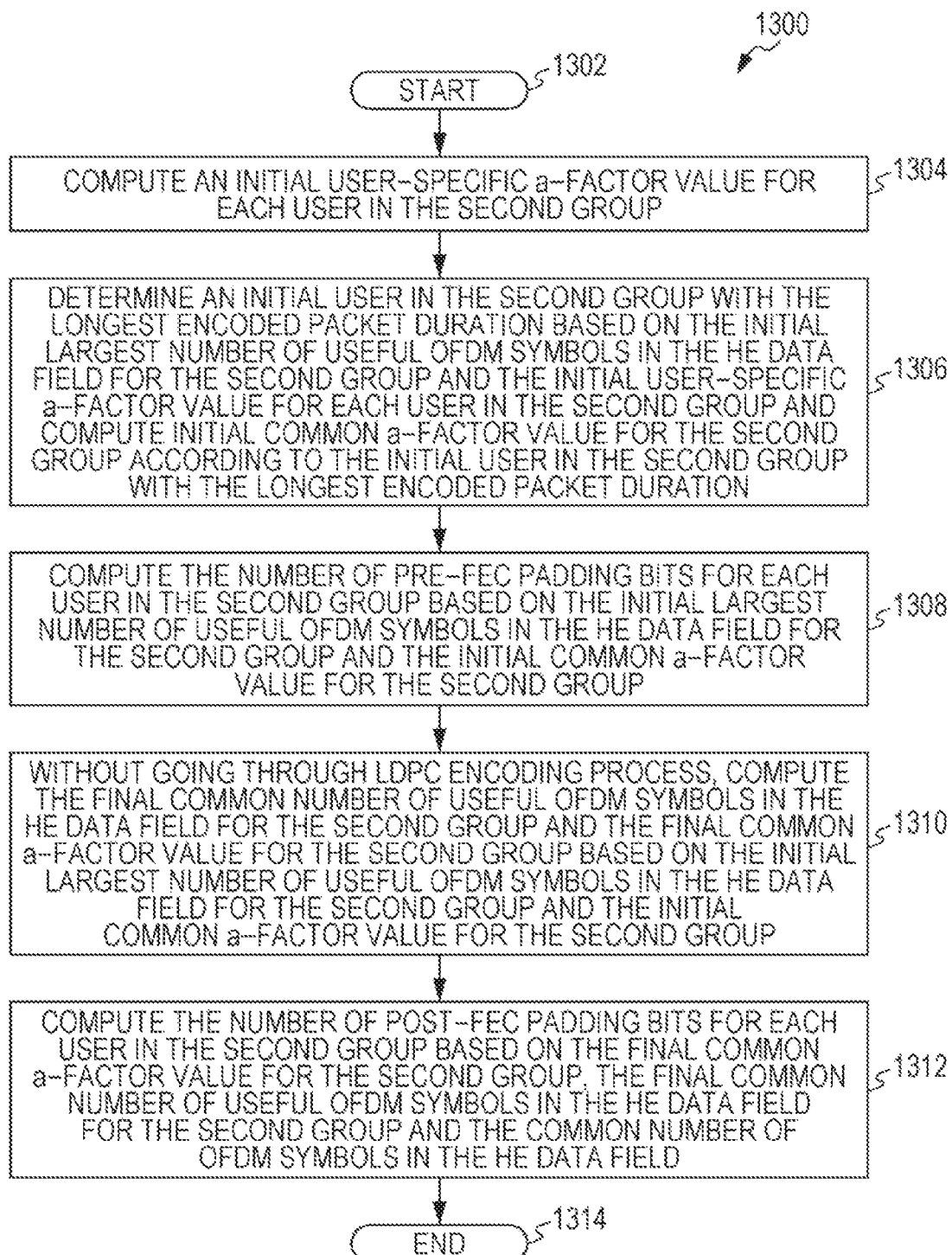
FIG. 13 shows a flowchart illustrating an example method for determining the padding related parameters for the second group according to a second embodiment of the second aspect of the present disclosure.

FIG. 13 illustrates an example method 1300 for determining the padding related parameters for the second group according to the second embodiment of the second aspect of the present disclosure. The method 1300 starts at step 1302. Step 1304 to step 1308 of the method 1300 are the same as step 1004 to step 1008 of the method 1000, respectively.

At step 1310, the final common number of useful OFDM symbols in the HE data field 120 for the second group and the final common a-factor value for the second group are computed based on the initial largest number of useful OFDM symbols in the HE data field 120 for the second group and the initial common a-factor value for the second group. If LDPC is used by at least one of the users in the second group, the final common number of useful OFDM symbols in the HE data field 120 for the second group is shown by the following formula.

$$N_{SYM,G_2} = \begin{cases} N_{SYM\_max\_init,G_2} + m_{STBC}, & \text{if } a_{init,G_2} = 4 \\ N_{SYM\_max\_init,G_2}, & \text{otherwise} \end{cases}$$

The final common a-factor value for the second group is shown by the following formula.

$$a_{G_2} = \begin{cases} 1, & \text{if } a_{init,G_2} = 4 \\ a_{init,G_2} + 1, & \text{otherwise} \end{cases}$$

If BCC is used by all of the users in the second group, the final common number of useful OFDM symbols in the HE data field 120 for the second group is shown by the following formula.

$$N_{SYM,G_2} = N_{SYM\_max\_init,G_2}$$

The final common a-factor value for the second group is shown by the following formula.

$$a_{G_2} = a_{init,G_2}$$

The method 1312 of the method 1100 is the same as step 1012 of the method 1000. The method 1300 stops at step 1314.

Sixth Embodiment

According to a third embodiment of the second aspect of the present disclosure, the final common a-factor value for the second group $a_{G_2}$ has a value of 1 and the condition for setting the LDPC Extra Symbol for the Second Group field to 1 is met for at least one user in the second group. As a result, the a-factor for the Second Group field and the LDPC Extra Symbol for the Second Group field in the HE-SIG-A 110 can be ignored, which leads to reduced signaling requirement in the HE-SIG-A 110. Furthermore, similar to the second embodiment of the second aspect of the present disclosure, there is no need of going through the LDPC encoding process in order to compute the final common a-factor value for the second group and the final common number of useful OFDM symbols in the HE data field 120 for the second group.

Figure 14:
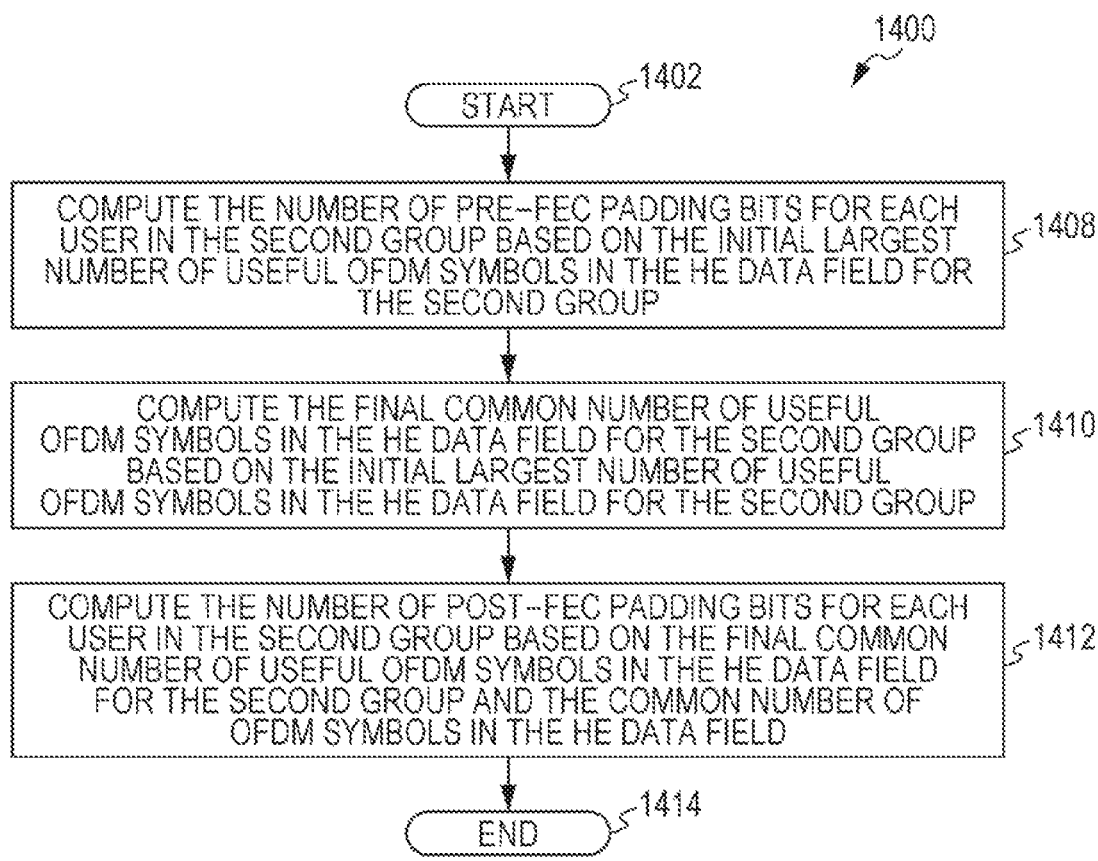
FIG. 14 shows a flowchart illustrating an example method for determining the padding related parameters for the second group according to a third embodiment of the second aspect of the present disclosure.

FIG. 14 illustrates an example method 1400 for determining the padding related parameters for the second group according to the third embodiment of the second aspect of the present disclosure. The method 1400 starts at step 1402. At step 1408, the number of pre-FEC padding bits for each user in the second group are computed based on the initial largest number of useful OFDM symbols in the HE data field 120 for the second group, $N_{SYM\_max\_init,G_2}$, which can be obtained according to Equation (4) during the user grouping. For example, the number of pre-FEC padding bits for user u in the second group is computed by the following formula.

$$N_{PAD,PRE-FEC,u} = (N_{SYM\_max\_init,G_2} - m_{STBC}) \cdot N_{DBPS,u} + m_{STBC} \cdot N_{DBPS,u} - 8 \cdot APEP\_LENGTH_u - N_{tail} \cdot N_{ES,u} - N_{service},$$

At step 1410, the final common number of useful OFDM symbols in the HE data field 120 for the second group is computed based on the initial largest number of useful OFDM symbols in the HE data field 120 for the second group by the following formula.

$$N_{SYM,G_2} = N_{SYM\_max\_init,G_2} + m_{STBC}$$

At step 1412, the number of post-FEC padding bits for each user in the second group is computed based on the final common number of useful OFDM symbols in the HE data field 120 for the second group and the common number of OFDM symbols in the HE data field 120. For example, the number of post-FEC padding bits for user u in the second group is computed by the following formula.

$$N_{PAD,POST-FEC,u} = \frac{N_{SYM} - N_{SYM,G_2}}{m_{STBC}} \cdot N_{CBPS,u} + N_{CBPS,u} - N_{CBPS,short,u}$$

The method 1400 stops at step 1414.

<Configuration of an Access Point>

Figure 15:
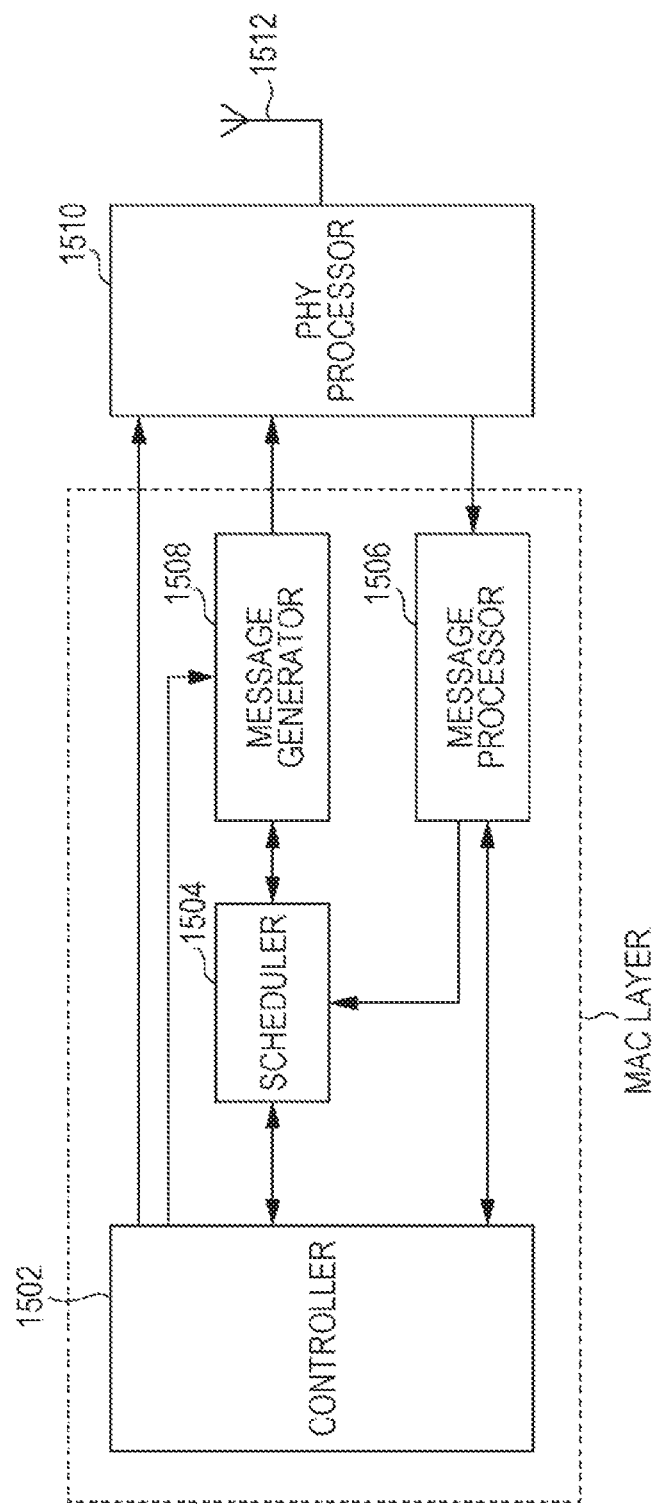
FIG. 15 shows a block diagram illustrating an example configuration of the AP (Access Point) according to the present disclosure.

FIG. 15 is a block diagram illustrating an example configuration of the AP according to the present disclosure. The AP comprises a controller 1502, a scheduler 1504, a message generator 1508, a message processor 1506, a PHY processor 1510 and an antenna 1512.

The antenna 1512 can comprise one antenna port or a combination of a plurality of antenna ports. The controller 1502 is a MAC protocol controller and controls general MAC protocol operations. For downlink transmission, the scheduler 1504 performs frequency scheduling under the control of the controller 1502 based on channel quality indicators (CQIs) from STAs and assigns data for STAs to RUs.

The scheduler 1504 also outputs the resource assignment results to the message generator 1508. The message generator 1508 generates corresponding control signaling (i.e., common control information, resource assignment information and per-user allocation information) and data for scheduled STAs, which are formulated by the PHY processor 1510 into the HE packets and transmitted through the antenna 1512. In particular, the controller 1502 computes the padding and PE related parameters according to the above mentioned embodiments of the various aspects of the present disclosure, which are provided to the PHY processor 1510 to guide the formulation of the HE packet, including padding and packet extension according to the above mentioned embodiments of the various aspects of the present disclosure.

On the other hand, the message processor 1506 analyzes the received CQIs from STAs through the antenna 1512 under the control of the controller 1502 and provides them to scheduler 1504 and controller 1502. These CQIs are received quality information reported from the STAs. The CQI may also be referred to as "CSI" (Channel State Information).

<Configuration of a STA>

Figure 16:
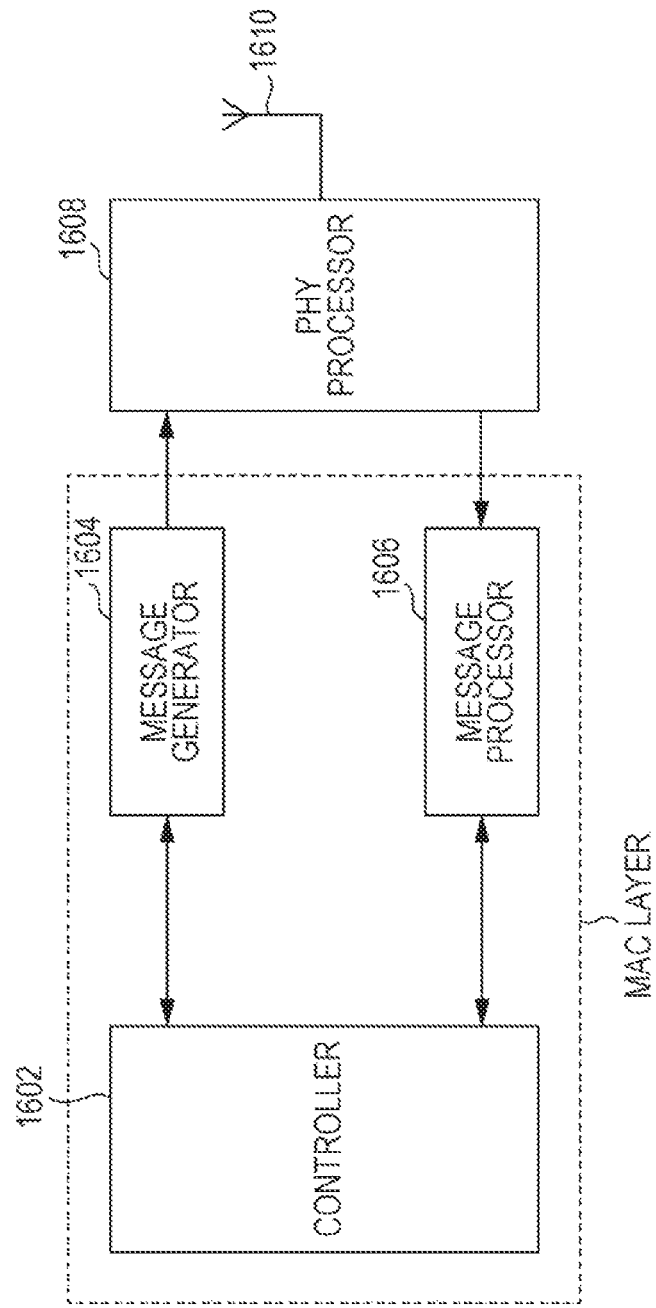
FIG. 16 shows a block diagram illustrating an example configuration of the STA according to the present disclosure.

FIG. 16 is a block diagram illustrating an example configuration of the STA according to the present disclosure. The STA comprises a controller 1602, a message generator 1604, a message processor 1606, a PHY processor 1608 and an antenna 1610.

The controller 1602 is a MAC protocol controller and controls general MAC protocol operations. The antenna 1610 can comprise one antenna port or a combination of a plurality of antenna ports. For downlink transmission, the antenna 1610 receives downlink signal including HE packets, and the message processor 1606 identifies its designated RUs and its specific allocation information from the control signaling included in the received HE packet, and decodes its specific data from the received HE packet at its designated RUs according to its specific allocation information. Padding and packet extension applied to the received HE packet was formulated by the AP according to the above mentioned embodiments of the various aspects of the present disclosure. The message processor 1606 estimates channel quality from the received HE packet through the antenna 1610 and provides them to controller 1602. The message generator 1604 generates CQI message, which is formulated by the PHY processor 1608 and transmitted through the antenna 1610.

In the foregoing embodiments, the present disclosure is configured with hardware by way of example, but the present disclosure may also be provided by software in cooperation with hardware.

In addition, the functional blocks used in the descriptions of the embodiments are typically implemented as LSI devices, which are integrated circuits. The functional blocks may be formed as individual chips, or a part or all of the functional blocks may be integrated into a single chip. The term "LSI" is used herein, but the terms "IC," "system LSI," "super LSI" or "ultra LSI" may be used as well depending on the level of integration.

In addition, the circuit integration is not limited to LSI and may be achieved by dedicated circuitry or a general-purpose processor other than an LSI. After fabrication of LSI, a field programmable gate array (FPGA), which is programmable, or a reconfigurable processor which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology and/or the like.

This disclosure can be applied to a method for formatting and transmitting data in a wireless communications system.

What is claimed is:

1. A transmission method comprising:
generating a transmission signal for each of a plurality of users, the transmission signal including a plurality of OFDM symbols for a data field, wherein a last OFDM symbol of the plurality of OFDM symbols can be partitioned into four segments, and wherein the generating of the transmission signal includes:
computing, for each of the plurality of users, an initial padding factor value that is associated with one of the four segments and computing, for each of the plurality of users, an initial number of OFDM symbols for the data field;
determining a user with a longest packet duration among the plurality of users;
determining a common padding factor value that is the initial padding factor value of the determined user with the longest packet duration;
determining a common number of OFDM symbols that is the initial number of OFDM symbols for the data field of the determined user with the longest packet duration;
adding, for each of the plurality of users, pre-FEC padding bits toward one of four possible boundaries of the last OFDM symbol, the one of four possible boundaries being represented by the determined common padding factor value; and
adding post-FEC padding bits in remaining segment(s) of the last OFDM symbol; and
transmitting the generated transmission signal.

2. The transmission method according to claim 1, wherein a number of the pre-FEC padding bits is determined for each of the plurality of users based on the determined common padding factor value.

3. The transmission method according to claim 1, wherein information bits and the added pre-FEC padding bits in the data field are encoded using either a Binary Convolutional Code (BCC) or a Low Density Parity Check (LDPC).

4. The transmission method according to claim 1, wherein the data field includes information bits, and the initial padding factor value for each of the plurality of users is determined based on the information bits.

5. The transmission method according to claim 1, wherein a number of the post-FEC padding bits is determined based on the common padding factor value.

6. The transmission method according to claim 1, wherein
when the plurality of users are grouped into a first group and a second group, and the second group of users has a shorter packet duration than the first group of users,
the pre-FEC padding bits are added toward the end of one of four segments of the last OFDM symbol in the transmission signal for the first group; and
the pre-FEC padding bits are added toward the end of one of four segments of an OFDM symbol other than the last OFDM symbol and the pre-FEC padding bits are not included in the last OFDM symbol in the transmission signal for the second group.

7. A transmission apparatus comprising:
a transmission signal generator which, in operation, generates a transmission signal for each of a plurality of users, the transmission signal including a plurality of OFDM symbols for a data field, wherein a last OFDM symbol of the plurality of OFDM symbols can be partitioned into four segments, and wherein the transmission signal generator generates the transmission signal by:
 computing, for each of the plurality of users, an initial padding factor value that is associated with one of the four segments and computing, for each of the plurality of users, an initial number of OFDM symbols for the data field;
 determining a user with a longest packet duration among the plurality of users;
 determining a common padding factor value that is the initial padding factor value of the determined user with the longest packet duration;
 determining a common number of OFDM symbols that is the initial number of OFDM symbols for the data field of the determined user with the longest packet duration;
 adding, for each of the plurality of users, pre-FEC padding bits toward one of four possible boundaries of the last OFDM symbol, the one of four possible boundaries being represented by the determined common padding factor value; and
 adding post-FEC padding bits in remaining segment(s) of the last OFDM symbol; and
a transmitter which, in operation, transmits the generated transmission signal.

8. The transmission apparatus according to claim 7, wherein a number of the pre-FEC padding bits is determined for each of the plurality of users based on the determined common padding factor value.

9. The transmission apparatus according to claim 7, wherein information bits and the added pre-FEC padding bits in the data field are encoded using either a Binary Convolutional Code (BCC) or a Low Density Parity Check (LDPC).

10. The transmission apparatus according to claim 7, wherein the data field includes information bits, the initial padding factor value for each of the plurality of users is determined based on the information bits.

11. The transmission apparatus according to claim 7, wherein a number of the post-FEC padding bits is determined based on the common padding factor value.

12. The transmission apparatus according to claim 7, wherein
when the plurality of users are grouped into a first group and a second group, and the second group of users has a shorter packet duration than the first group of users,
the pre-FEC padding bits are added toward the end of one of four segments of the last OFDM symbol in the transmission signal for the first group; and
the pre-FEC padding bits are added toward the end of one of four segments of an OFDM symbol other than the last OFDM symbol and the pre-FEC padding bits are not included in the last OFDM symbol in the transmission signal for the second group.

* * * * *